(12) United States Patent
Dao et al.

(10) Patent No.: US 11,368,873 B2
(45) Date of Patent: Jun. 21, 2022

(54) METHOD AND SYSTEM OF PACKET AGGREGATION

(71) Applicants: Ngoc Dung Dao, Ottawa (CA); Xu Li, Nepean (CA); Hang Zhang, Nepean (CA)

(72) Inventors: Ngoc Dung Dao, Ottawa (CA); Xu Li, Nepean (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 16/217,923

(22) Filed: Dec. 12, 2018

(65) Prior Publication Data

US 2019/0191330 A1 Jun. 20, 2019

Related U.S. Application Data

(60) Provisional application No. 62/653,987, filed on Apr. 6, 2018, provisional application No. 62/599,046, filed on Dec. 15, 2017.

(51) Int. Cl.
| | |
|---|---|
| *H04L 12/46* | (2006.01) |
| *H04W 28/06* | (2009.01) |
| *H04L 69/22* | (2022.01) |
| *H04W 72/04* | (2009.01) |

(52) U.S. Cl.
CPC ......... *H04W 28/06* (2013.01); *H04L 12/4633* (2013.01); *H04L 69/22* (2013.01); *H04W 72/0413* (2013.01); *H04L 2212/00* (2013.01)

(58) Field of Classification Search
CPC . H04L 12/4633; H04L 2212/00; H04L 69/22; H04W 28/06; H04W 72/0413
See application file for complete search history.

(56) References Cited

U.S. PATENT DOCUMENTS

| | | | |
|---|---|---|---|
| 6,721,334 B1* | 4/2004 | Ketcham | ................. H04L 49/90 370/465 |
| 2004/0170125 A1 | 9/2004 | O'Neill | |
| 2005/0074001 A1* | 4/2005 | Mattes | ................. H04L 45/583 370/389 |

(Continued)

FOREIGN PATENT DOCUMENTS

| | | |
|---|---|---|
| CN | 102273149 A | 12/2011 |
| CN | 102474891 A | 5/2012 |

(Continued)

OTHER PUBLICATIONS

ETSI TS 136 523-3 V10.3.0 (May 2013).*

(Continued)

*Primary Examiner* — Abdelillah Elmejjarmi

(57) ABSTRACT

Methods, systems and architectures are described which provide at least one aggregated tunnel protocol, in addition to the existing per PDU session tunnel protocols (1, 2, . . . N). When the UE requests a new PDU session or a new QoS flow, the SMF may establish a Per PDU Session Tunnel to serve this PDU session. Alternatively, an Aggregated Tunnel may be selected to serve the PDU session or to serve the QoS flow. When a packet from a UE arrives, the receiving network function can send this packet either using a per PDU session tunnel protocol or aggregated tunnel protocol.

16 Claims, 20 Drawing Sheets

(56) References Cited

U.S. PATENT DOCUMENTS

| | | | |
|---|---|---|---|
| 2005/0152358 A1* | 7/2005 | Giesberts | H04L 69/324 370/389 |
| 2007/0047574 A1* | 3/2007 | Ling | H04N 21/23614 370/465 |
| 2007/0201440 A1* | 8/2007 | Ganguly | H04L 45/00 370/356 |
| 2009/0125778 A1* | 5/2009 | Uchida | H04L 1/1819 714/749 |
| 2010/0080170 A1* | 4/2010 | Larmo | H04L 12/4633 370/328 |
| 2010/0158026 A1 | 6/2010 | Valmikam et al. | |
| 2013/0028270 A1* | 1/2013 | Wu | H04L 45/00 370/474 |
| 2013/0083660 A1 | 4/2013 | Rajagopalan et al. | |
| 2013/0136064 A1* | 5/2013 | Jamadagni | H04L 69/03 370/328 |
| 2016/0119157 A1 | 4/2016 | Hua et al. | |
| 2017/0099231 A1 | 4/2017 | Li et al. | |
| 2017/0289046 A1* | 10/2017 | Faccin | H04L 47/2441 |
| 2020/0120570 A1* | 4/2020 | Youn | H04W 36/0033 |
| 2020/0154320 A1* | 5/2020 | Xu | H04W 28/02 |

FOREIGN PATENT DOCUMENTS

| | | |
|---|---|---|
| CN | 106900081 A | 6/2017 |
| CN | 107295576 A | 10/2017 |
| WO | 2017076826 A1 | 5/2017 |

OTHER PUBLICATIONS

"General Packet Radio System (GPRS) Tunnelling Protocol User Plane (GTPv1-U)"; 3GPP TS 29.281 V15.0.0 (Sep. 2017).

"An RTP Payload Format for User Multiplexing"; Internet Engineering Task Force, May 6, 1998.

Huawei et al., Updates of per node-level tunnel model and interim agreement, SA WG2 Meeting #117, Oct. 17-21, 2016, Kaohsiung, S2-166110, 8 pages.

* cited by examiner

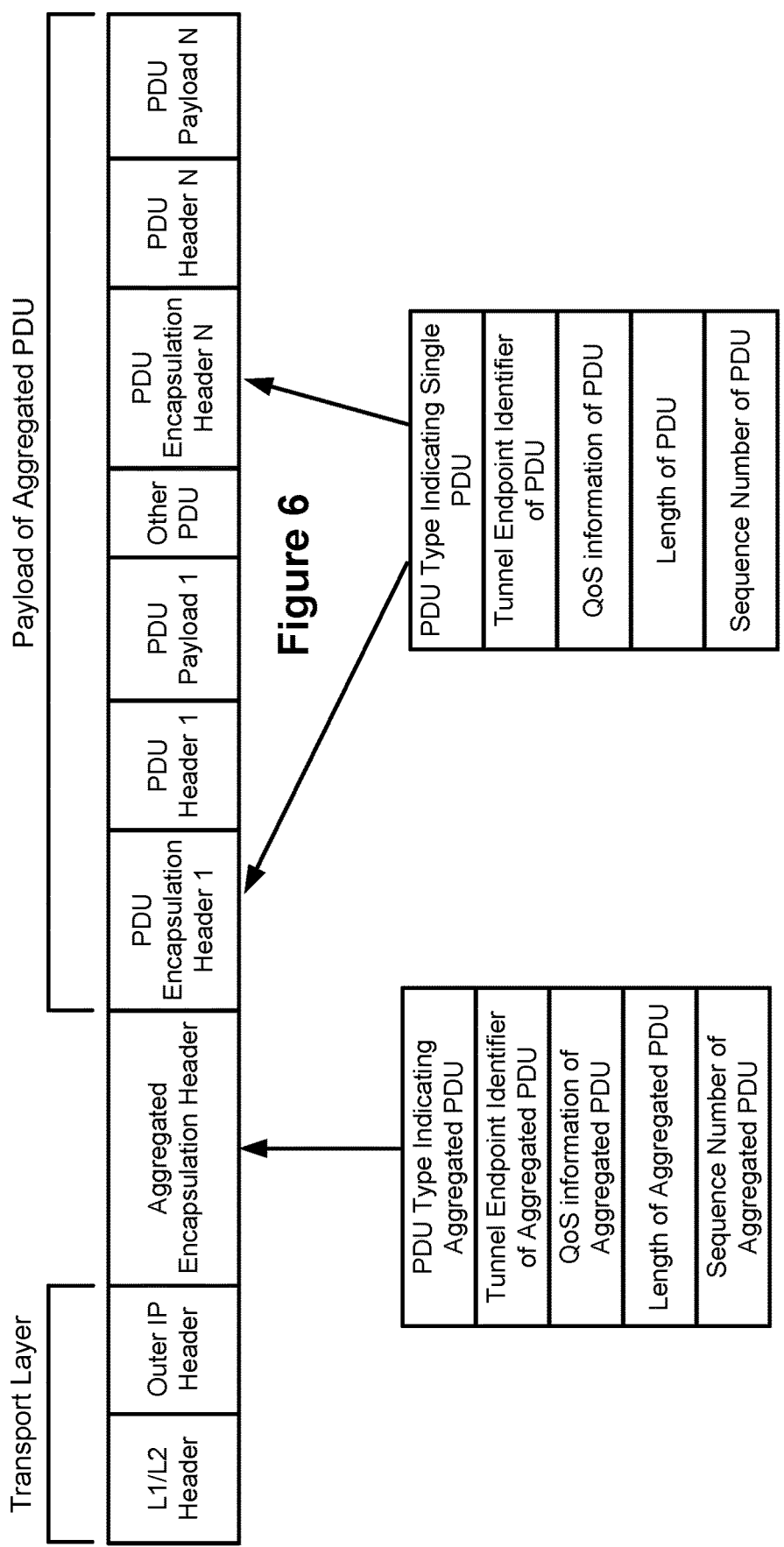

METHOD AND SYSTEM OF PACKET AGGREGATION

CROSS REFERENCE TO RELATED APPLICATIONS

The present application is based on, and claims benefit of, U.S. provisional Patent Application No. 62/599,046 filed Dec. 15, 2017, and U.S. provisional Patent Application No. 62/653,987 filed Apr. 6, 2018, the entire content of which, including appendices, are incorporated herein by reference.

FIELD OF THE INVENTION

The present invention generally pertains to the field of Communications Networks, and particular embodiments or aspects relate to Wireless Networks which support a large number of transmissions.

BACKGROUND

Packet aggregation was proposed for example by the Internet Engineering Task Force (IETF) in IETF Internet Draft by J. Rosenberg, H. Schulzrinne, "An RTP Payload Format for User Multiplexing", May 6, 1998. This format allowed for the aggregation of packet payloads between two internet protocol (IP) nodes. However, this assumes the connection links have fixed channel capacity and transport network may provide sufficient quality of service (QoS) for packet flows. Such a solution has problems for wireless networks which support mobile user equipment (UE), due to mobility of the UEs and variation of wireless channel capacity.

The 3rd Generation Partnership Project (3GPP) has proposed a General Packet Radio System (GPRS) Tunnelling Protocol User Plane, which includes a GPRS Tunnelling Protocol (GTP) for the user plane (GTP-U) for core networks (CNs) in 3GPP TS 29.281, Version 15.0.0, published September 2017, "General Packet Radio System (GPRS) Tunneling Protocol User Plane (GTPv1-U))". The GTP-U provides a user plane tunnel to allow packet aggregation for UE user plane packets. However, the overhead introduced by the GTP-U can be large, and prohibitively large in some cases.

For example, for the Internet of Things (IoT) devices which utilize Machine Type Communications (MTC), there can be many devices, (e.g., utility meters) which each sends or receives small sized packets. For example, some IoT applications, the IoT packet size could be as small as 10 bytes. When such data packets are sent over 3GPP core network, the data packet are encapsulated in tunnel protocol packet format. For example, the GTP-U protocol can add 12 bytes of header. The GTP-U packet is the typically transmitted over an UDP/IPv4 or UDP/IPv6 transport network. The overhead of UDP protocol is 12 bytes, while the protocol overhead of IPv4 and IPv6 can add 20 and 48 bytes, respectively. Therefore, if a small-sized packet of 10 bytes is sent over the 3GPP CN, the overhead-to-data ratio can be very high; e.g. adding 60 bytes of header to a 10 byte packet implies the overhead is 6 times higher than the data in the case of GTP-U and UDP/IPv6 protocols.

Accordingly, there may be a need for a system and method which allows for packet aggregation in wireless networks that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

An aspect of the disclosure provides a method executed by a session management function. Such a method includes receiving trigger information from a network function relating to the status of an interface capable of using an aggregated tunnel between first and second user plane functions. The method includes the session management function subsequent to the occurrence of receiving trigger information, sending messages to cause the change to the status of the interface with respect to the aggregated tunnel. In some embodiments the change of the status of the interface with respect to the aggregated tunnel is selected from at least one of: establishing the aggregated tunnel; modifying the aggregated tunnel; and releasing the aggregated tunnel. In some embodiments sending messages includes sending the messages to the user plane functions which use the interface. In some embodiments sending messages includes sending the format of the aggregated tunnel to the user plane functions. In some embodiments sending messages includes sending criteria to select PDU packets of a PDU session over the aggregated tunnel. In some embodiments determining whether a change to the status of an aggregated tunnel should be made.

Another aspect of the disclosure provides a method executed by a packet aggregation function of a user plane function. The method includes receiving a packet; evaluation selection criteria in relation to the packet; and selecting a type of tunnel to transport the packet. In some embodiments selecting a type of tunnel to transport the packet includes selecting one of a per PDU session tunnel; and an aggregated tunnel. Accordingly, some embodiments are configured to provide both types of tunnels, and selecting between the types of tunnels based on the selection criteria. In some embodiments the selection criteria includes at least one of: size of the packet; the Quality of Service requirement for the packet; and the destination of the packet.

Other aspects of the disclosure provide aggregated packet formats as described.

Another aspect of the disclosure provides a network function. Such a network function includes a network interface for receiving data from and transmitting data to network functions connected to a network, a processor, and a non-transient memory. The non transient memory stores instructions that when executed by the processor cause the network function to be configured to perform the methods as described herein. Accordingly Network functions such as the session management function and the network functions including the packet aggregation and packet de-aggregation functions can be so configured Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present invention may provide systems and methods which can provide flexible networks capable of efficiently serving the needs of various devices and applications. For example, some applications require large packet size or have urgent quality of service (QoS) requirements. Larger overheads can be utilized to satisfy such requirements. Other applications can result in the transmission of large numbers of small packets which are do not have stringent QoS requirements such as very small packet delay budget (PDB). It is desirable to reduce overhead in such cases. Embodiments discussed herein provide a flexible architecture which can accommodate both of these types of applications. Accordingly embodiments include new aggregated tunnel protocols and transmission methods that support delivery of aggregated packets between two network nodes or two network functions while minimizing the tunnel protocol overhead.

BRIEF DESCRIPTION OF THE FIGURES

Further features and advantages of the present invention will become apparent from the following detailed description, taken in combination with the appended drawings, in which:

FIG. 6 illustrates an example format of aggregated tunnel packets, according to an embodiment;

FIG. 7 illustrates the format of the Aggregated Encapsulation Header of FIG. 6, according to embodiment;

FIG. 8 illustrates the format of each PDU Encapsulation Header of FIG. 6, according to embodiment;

DETAILED DESCRIPTION

Figure 1:
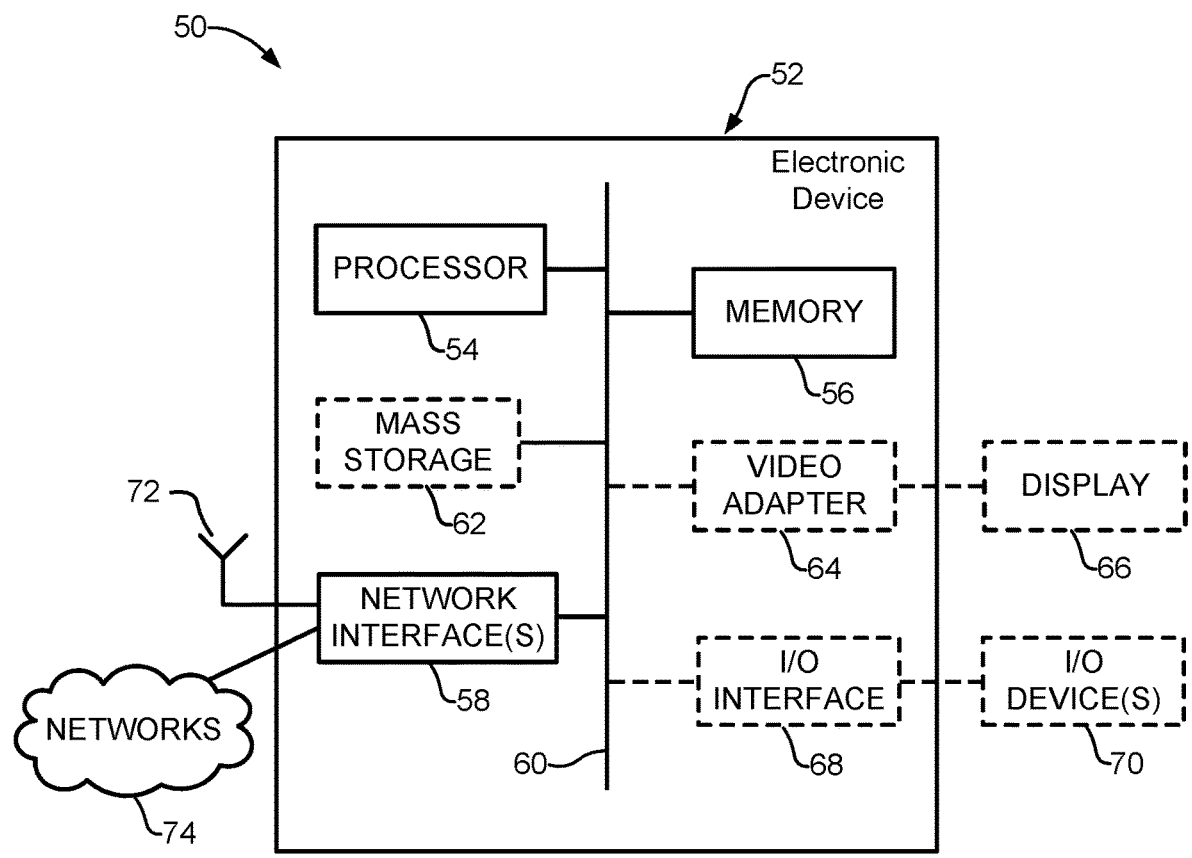
FIG. 1 is a block diagram of an electronic device 52 within a computing and communications environment 50 that may be used for implementing devices and methods in accordance with representative embodiments of the present invention.

FIG. 1 is a block diagram of an electronic device (ED) 52 illustrated within a computing and communications environment 50 that may be used for implementing the devices and methods disclosed herein. In some embodiments, the electronic device may be an element of communications network infrastructure, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or a Public Land Mobility Network (PLMN). In other embodiments, the electronic device may be a device that connects to the network infrastructure over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 52 typically includes a processor 54, such as a Central Processing Unit (CPU), and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The electronic device 52 may also include one or more network interfaces 58, which may include at least one of a wired network interface and a wireless network interface. As illustrated in FIG. 1, network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the electronic device 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the electronic device 52 to external input and output devices. Examples of input and output devices include a display 66 coupled to the video adapter 64 and an I/O device 70 such as a touch-screen coupled to the I/O interface 68. Other devices may be coupled to the electronic device 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, electronic device 52 may be a standalone device, while in other embodiments electronic device 52 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2A:
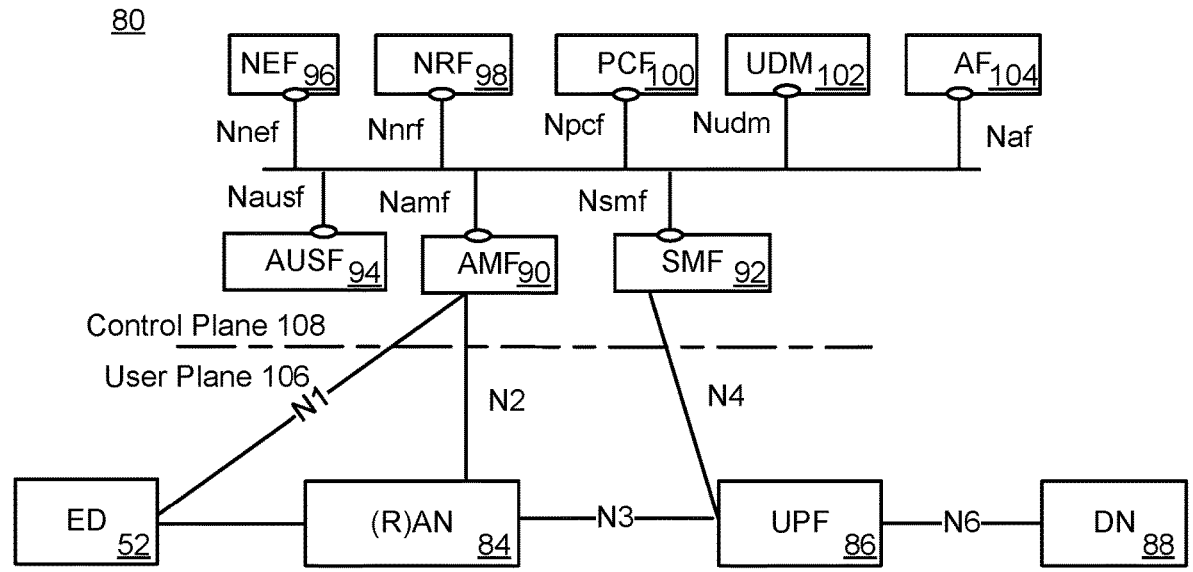
FIG. 2A is a block diagram illustrating a service-based view of a system architecture of a 5G Core Network.

FIG. 2A illustrates a service-base architecture 80 for a 5G or Next Generation Core Network (5GCN/NGCN/NCN). This illustration depicts logical connections between nodes and functions, and its illustrated connections should not be interpreted as direct physical connection. ED 50 forms a radio access network connection with a (Radio) Access Network node (R)AN 84, which is connected to a User Plane (UP) Function (UPF) 86 such as a UP Gateway over a network interface such as an N3 interface. UPF 86 connects to a Data Network (DN) 88 over a network interface such as an N6 interface. DN 88 may be a data network used to provide an operator service, or it may be outside the scope of the standardization of the Third Generation Partnership Project (3GPP), such as the Internet, a network used to provide third party service, and in some embodiments DN 88 may represent an Edge Computing network or resource, such as a Mobile Edge Computing (MEC) network. ED 52 also connects to the Access and Mobility Management Function (AMF) 90. The AMF 90 is responsible for authentication and authorization of access requests, as well as Mobility management functions. The AMF 90 may perform other roles and functions as defined by the 3GPP Technical Specification (TS) 23.501. In a service based view, AMF 90 can communicate with other functions through a service based interface denoted as Namf. The Session Management Function (SMF) 92 is a network function that is responsible for the allocation and management of IP addresses that are assigned to a UE as well as the selection of a UPF 86 (or a particular instance of a UPF 86) for traffic associated with a particular session of ED 52. The SMF 92 can communicate with other functions, in a service based view, through a service based interface denoted as Nsmf. The Authentication Server Function (AUSF) 94, provides authentication services to other network functions over a service based Nausf interface. A Network Exposure Function (NEF) 96 can be deployed in the network to allow servers, functions and other entities such as those outside a trusted domain to have exposure to services and capabilities within the network. In one such example, an NEF 96 can act much like a proxy between an application server outside the illustrated network and network functions such as the Policy Control Function (PCF) 100, the SMF 92, the AMF 90, and other functions, so that the external application server can provide information that may be of use in the setup of the parameters associated with a data session. The NEF 96 can communicate with other network functions through a service based Nnef network interface. The NEF 96 may also have an interface to non-3GPP functions. A Network Repository Function (NRF) 98, provides network service discovery functionality. The NRF 98 may be specific to the Public Land Mobility Network (PLMN) or network operator, with which it is associated. The service discovery functionality can allow network functions and UEs connected to the network to determine where and how to access existing network functions, and may present the service based interface Nnrf. PCF 100 communicates with other network functions over a service based Npcf interface, and can be used to provide policy and rules to other network functions, including those within the control plane. Enforcement and application of the policies and rules is not necessarily the responsibility of the PCF 100, and is instead typically the responsibility of the functions to which the PCF 100 transmits the policy. In one such example the PCF 100 may transmit policy associated with session management to the SMF 92. This may be used to allow for a unified policy framework with which network behavior can be governed.

A Unified Data Management Function (UDM) 102 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 320 may employ an interface, such as Nudr to connect to a User Data Repository (UDR). The PCF 100 may be associated with the UDM 320 because it may be involved with requesting and providing subscription policy information to the UDR, but it should be understood that typically the PCF 100 and the UDM 102 are independent functions.

The PCF 100 may have a direct interface to the UDR 321 or can use Nudr interface to connection with UDR. The UDM 102 can receive requests to retrieve content stored in the UDR, or requests to store content in the UDR. The UDM 102 is typically responsible for functionality such as the processing of credentials, location management and subscription management. The UDR may also support any or all of Authentication Credential Processing, User Identification handling, Access Authorization, Registration/Mobility management, subscription management, and Short Message Service (SMS) management. The UDR is typically responsible for storing data provided by the UDM 102. The stored data is typically associated with policy profile information (which may be provided by PCF 100) that governs the access rights to the stored data. In some embodiments, the UDR may store policy data, as well as user subscription data which may include any or all of subscription identifiers, security credentials, access and mobility related subscription data and session related data.

Application Function (AF) 104 represents the non-data plane (also referred to as the non-user plane, or control plane) functionality of an application deployed within a network operator domain and within a 3GPP compliant network. The AF 104 interacts with other core network functions through a service based Naf interface, and may access network capability exposure information, as well as provide application information for use in decisions such as traffic routing. The AF 104 can also interact with functions such as the PCF 100 to provide application specific input into policy and policy enforcement decisions. It should be understood that in many situations the AF 104 does not provide network services to other NFs, and instead is often viewed as a consumer or user of services provided by other NFs. An application outside the 3GPP network, can perform many of the same functions as AF 104 through the use of NEF 96.

ED 52 communicates with network functions that are in the User Plane (UP) 106, and the Control Plane (CP) 108. The UPF 86 is a part of the CN UP 106 (DN 88 being outside the 5GCN). (R)AN 84 may be considered as a part of a User Plane, but because it is not strictly a part of the CN, it is not considered to be a part of the CN UP 106. AMF 90, SMF 92, AUSF 94, NEF 96, NRF 98, PCF 100, and UDM 102 are functions that reside within the CN CP 108, and are often referred to as Control Plane Functions. AF 104 may communicate with other functions within CN CP 108 (either directly or indirectly through the NEF 96), but is typically not considered to be a part of the CN CP 108.

Those skilled in the art will appreciate that there may be a plurality of UPFs connected in series between the (R)AN 84 and the DN 88, and as will be discussed with respect to FIG. 2B, multiple data sessions to different DNs can be accommodated through the use of multiple UPFs in parallel.

Figure 2B:
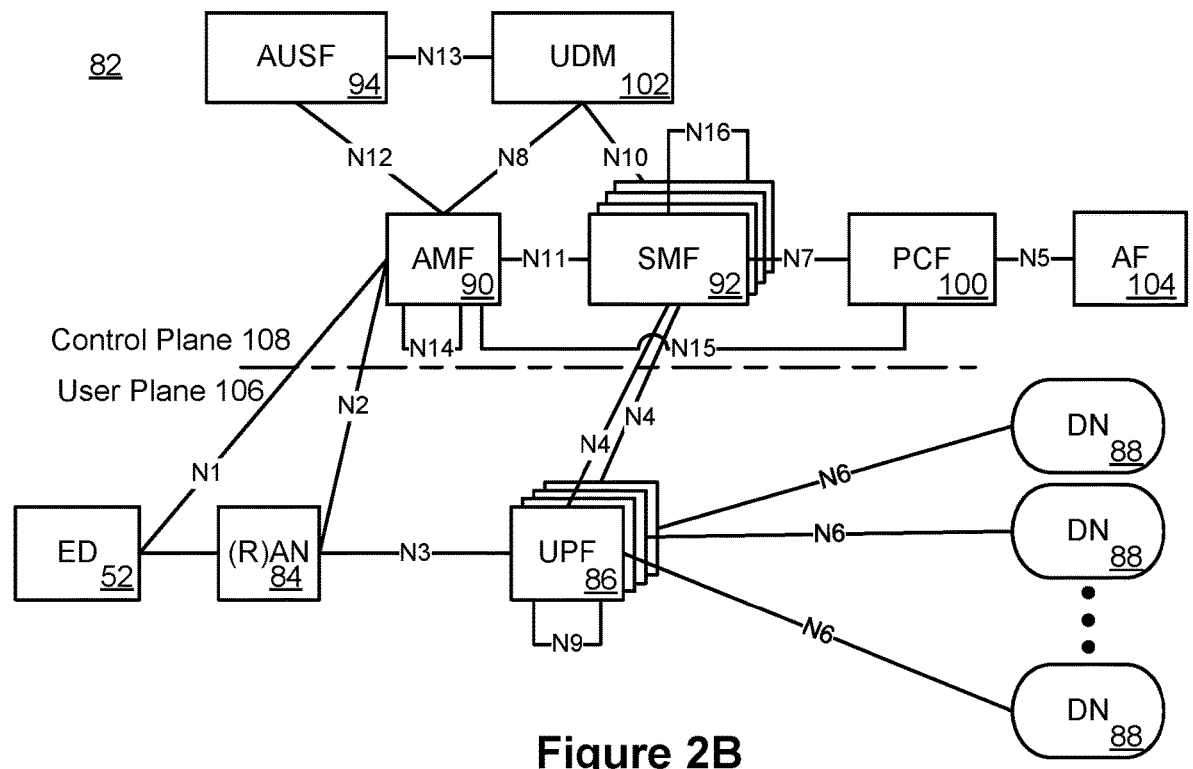
FIG. 2B is a block diagram illustrating the system architecture of a 5G Core Network as shown in FIG. 2A from the perspective of reference point connectivity.

FIG. 2B illustrates a reference point representation of a 5G Core Network architecture 82. For the sale of clarity, some of the network functions illustrated in FIG. 2A are omitted from this figure, but it should be understood that the omitted functions (and those not illustrated in either FIG. 2A or FIG. 2B) can interact with the illustrated functions.

ED 52 connects to both (R)AN 84 (in the user plane 106) and AMF 90 (in the control plane 108). The ED-to-AMF connection is an N1 connection. (R)AN 84 also connects to the AMF 90, and does so over an N2 connection. The (R)AN 84 connects to a UPF function 86 over an N3 connection. The UPF 86 is associated with a PDU session, and connects to the SMF 92 over an N4 interface to receive session control information. If the ED has multiple PDU sessions active, they can be supported by multiple different UPFs, each of which is connected to an SMF over an N4 interface. It should be understood that from the perspective of reference point representation, multiple instances of either an SMF 92 or an UPF 86 are considered as distinct entities. The UPFs 86 each connect to a DN 88 outside the 5GCN over an N6 interface. SMF 92 connects to the PCF 100 over an N7 interface, while the PCF 100 connects to an AF 104 over an N5 interface. The AMF 90 connects to the UDM 102 over an N8 interface. If two UPFs in UP 106 connect to each other, they can do so over an N9 interface. The UDM 102 can connect to an SMF 92 over an N10 interface. The AMF 90 and AMF 92 connect to each other over an N11 interface. The N12 interface connects the AUSF 94 to the AMF 90. The AUSF can connect to the UDM 102 over the N13 interface. In networks in which there is a plurality of AMFs, they can connect to each other over an N14 interface. The PCF 100 can connect to an AMF 90 over the N15 interface. If there is a plurality of SMFs in the network, they can communicate with each other over an N16 interface.

It should also be understood that any or all of the functions and nodes, discussed above with respect to the architectures 80 and 82 of the 5G Core Network, may be virtualized within a network, and the network itself may be provided as a network slice of a larger resource pool.

Figure 3:
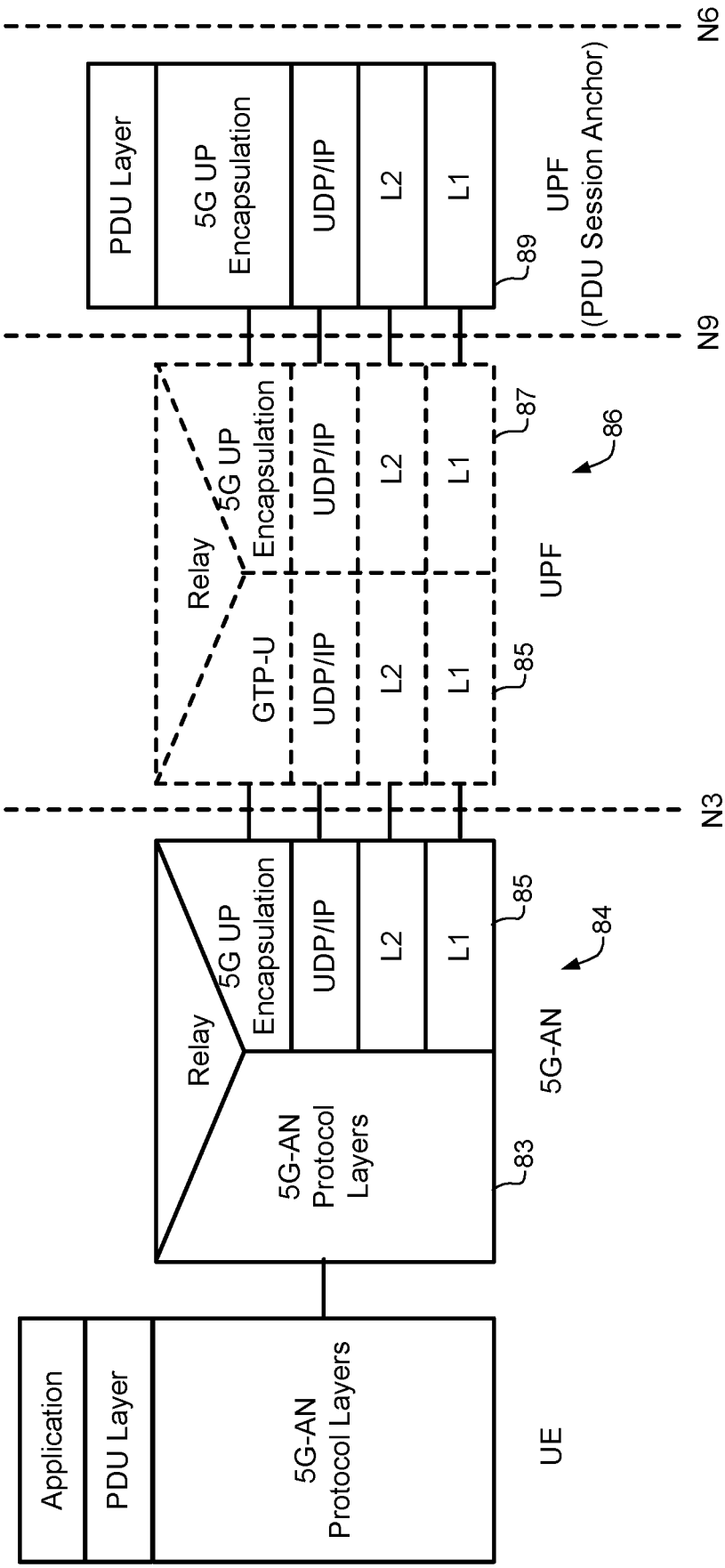
FIG. 3 illustrates a user plane protocol of a 5G Core Network.
Figure 4:
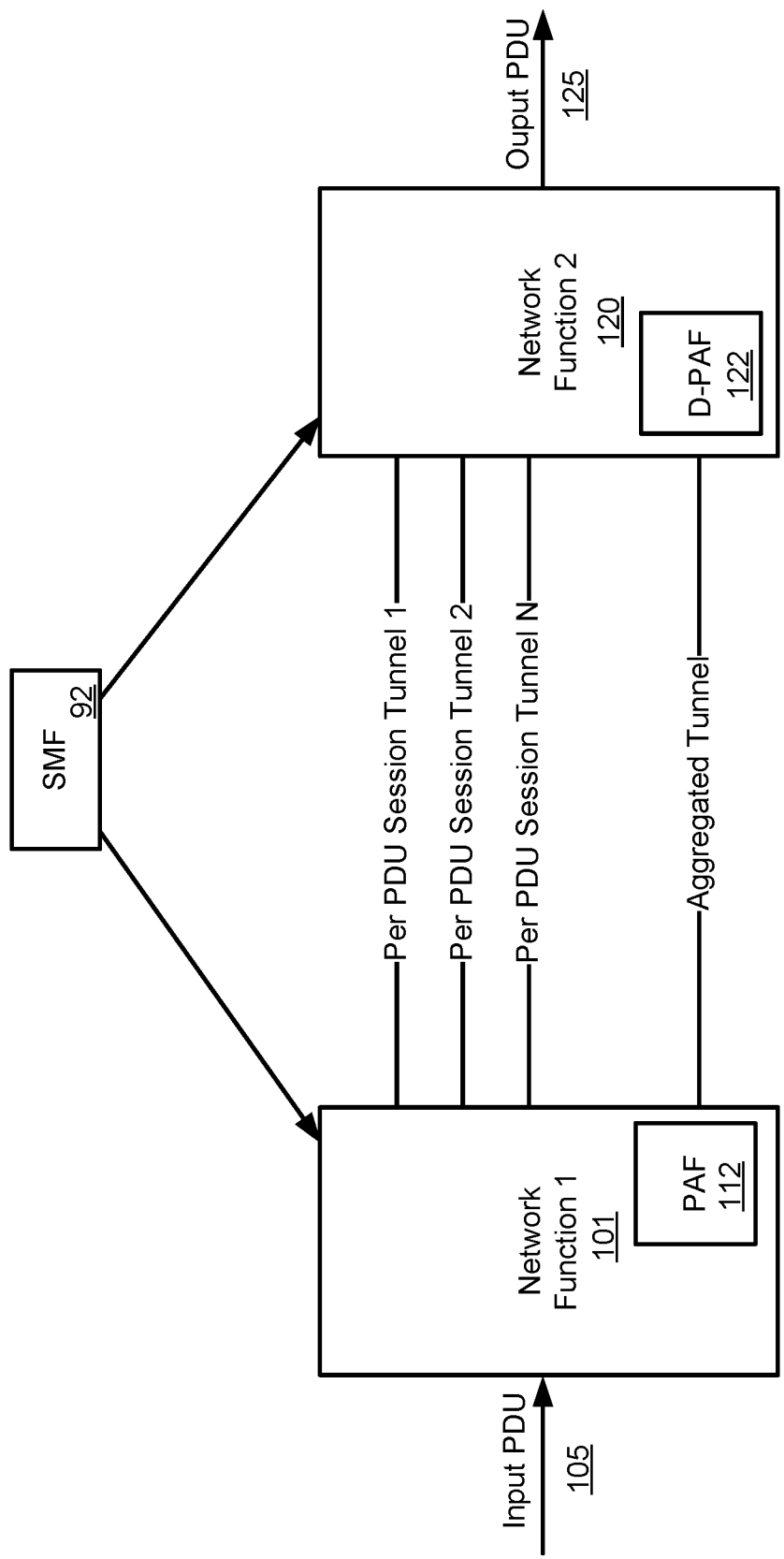
FIG. 4 is a block diagram schematically illustrating an architecture in which individual PDU session tunnels and an aggregated tunnel utilizing packet aggregation can be implemented, according to an embodiment.

FIG. 3 illustrates a user plane protocol of a 5G Core Network and the various network layer protocol stacks. FIG. 3 illustrates that a (R)AN 84 node can include a 5G-AN protocol layer stack for communicating with UEs. A (R)AN 84 can also include user plane protocol stack 85 for communicating with UPF 86 using the N3 interface. UPF 86 can communicate with other UPFs by using, protocol stack 87 and the N9 interface. Accordingly UPF 86 can use the user plane protocol stack 85 to communicate with the (R)AN 84 using the N3 interface. In some cases a PDU session uses a PDU session Anchor 89 which in turn connects to the DN 88 using the N6 interface. Accordingly UPF 86 can include a protocol stack 87 to communicate with another UPF, such as PDU Session Anchor UPF 89 using the N9 interface. In this illustration, only a single UPF 86 is illustrated between the R(AN) 84 and a PDU Session Anchor UPF 89. However it should be noted that there can be a number of intermediate or relay UPFs FIG. 4 is a block diagram schematically illustrating an architecture in which individual PDU session tunnels and an aggregated tunnel utilizing packet aggregation can be implemented, according to an embodiment. FIG. 4 illustrates two UP network functions, 101, 120. SMF 92 establishes session tunnels between network functions (NF) 101 and 120. A NF could be a (R)AN node or a UPF, or any network function in user plane. In some examples, a NF could be a control plane (CP) function. These session tunnels can be GTP-U tunnel, which is used to carry data for individual PDU sessions 1, 2 . . . N, or modified GTP-U protocols, or other tunnel protocols to deliver packets in UP and or to delivery control messages in CP. Alternatively, the common tunnel 110, which may be called aggregated tunnel 110, can be used to carry data of multiple PDU Sessions in UP or multiple control messages in CP.

In the following, the aggregated tunnel will be discussed in more detail below for the example of UP packet delivery. Accordingly examples will be discussed in which NFs 101, 120 are UPFs, although NFs 101 and 120 can be also a (R)AN node and a UPF. Accordingly UPF 101 includes a Packet Aggregation Function (PAF) and UP function 120 includes a De-aggregation PAF (D-PAF) 122. It should be noted that for ease of illustration, FIG. 4 illustrates transmission in a single direction such that packets travel from input PDU 105 through NF 101 towards the output PDU 125 direction via NF 120. It should be appreciated the data can be transmitted in both directions, and accordingly NFs would be configured with both a PAF and D-PAF. Further it should be appreciated that in some embodiments the SMF 92 can instruct the instantiation of a PAF and D-PAF as needed for each PDU session or groups of PDU sessions. Alternatively, each NF can be configured with one or multiple PAF and D-PAF functions, which can be configured with forwarding rules by the SMF 92 for each session or group of sessions.

In some embodiments, when the Network Functions, such as (R)AN and UPF, are instantiated, the SMF 92 can create one or multiple Aggregated Tunnels 110 between Network Functions. Each Aggregated Tunnel 110 may be used to serve 1 PDU session, or multiple PDU sessions of the same or different UEs which can be aggregated as discussed below. Alternatively, each Aggregated Tunnel 110 could carry traffic of certain QoS flows of PDU sessions of the same UE or different UEs. The PDU sessions can belong to one or multiple UEs. When a request for new session is received, the SMF 92 determines whether a per PDU session tunnel should be established and/or whether the PDU session can be associated with an existing (or new) aggregated tunnel 110. Both per PDU session tunnel and aggregated tunnel may be used simultaneously to carry packets of the same QoS Flow(s) of a PDU session. Alternatively, an aggregated tunnel may be used to carry packets of all QoS Flows of a PDU Session.

Accordingly, FIG. 4 illustrates an architecture which provides at least one aggregated tunnel protocol 110, in addition to the existing per PDU session tunnel protocols (1, 2, . . . N). When the UE requests a new PDU session or a new QoS flow, the SMF 92 may establish a Per PDU Session Tunnel to serve this PDU session. Alternatively, an Aggregated Tunnel 110 may be selected to serve the PDU session or to serve the QoS flow. When a packet from a UE arrives, the receiving network function can send this packet either using a per PDU session tunnel protocol or aggregated tunnel protocol. The PAF 102 of the NF 101 may determine which type of tunnel to use based on forwarding rules, which can be provided by the SMF 92. The PAF 102 determines the type of tunnel to use depending on such factors as the size of the packet, the QoS requirements of the QoS flow, and other factors such as the current buffer of the PDU session and buffer of other PDU sessions of the same UE and/or different UEs, as will be discussed in more detail below.

Assuming a PDU Session or some QoS Flow of a PDU Session is allocated to aggregated tunnel 110, packets belonging to that QoS Flows of the PDU Session are aggregated by the PAF 102 as will be discussed below. The D-PAF 122 de-aggregates the packets (and potentially re-aggregates, depending on whether the packets need to traverse intermediate NFs) for forwarding to the Output PDU 125

When a packet arrives, the Network Function 101 performs packet classification to identify the required QoS and maps the packet to the QoS Flow. The Network Function 101 could be a (R)AN node, could be a UPF. The Network Function 101, or more specifically the PAF 112, selects the Per PDU Session Tunnel or Aggregated Tunnel to send the PDU to the Network Function 120. The PAF 112 determines the tunnel based on any combination of following factors: instruction from the SMF for one or some QoS Flows or all QoS Flows of the PDU Session, the size of the packet payload, the QoS requirements, network slice information (such as S-NSSAI), UE group information (e.g. Internal Group ID, IMSI Group ID) and the destination (e.g. DNN (Data Network Name), DNAI). For example selection criteria in favor of using an Aggregated tunnel include: if the packet is small relative to the overhead, or the QoS requirements (e.g. Packet Delay Budget), can afford the amount of delay added by the aggregation (and de-aggregation process), or multiple packets have a common destination. However, for example, if a packet has an urgent QoS requirement, a per PDU session tunnel can be selected ever if the packet is small in size. The tunnel selection is based on one or more of following aggregation selection criteria.

- UE information: e.g. UE ID(s), 5G SUPI, GPSI (Generic Public Subscription Identifier) MSISDN, External Identifier, UE Category (e.g. narrow-band IoT devices), device class;
- Tunnel Endpoint ID (TEID(s)) of per PDU Session tunnel (s)
- Individual packet size;
- UE Group information: E.g. Internal Group Identifier(s), External Group Identifier;
- QoS parameters and characteristics of PDU Sessions: Packet delay budget, packet size, 5QI (5G QoS Identifier), QFI (QoS Flow Identifier), resource type, priority level, etc.;
- PDU Session Type: e.g. can be IPv4, IPv6, Ethernet or Unstructured;
- Network Slice information, e.g. Single Network Slice Selection Assistance Information (S-NSSAI), Network Slice instance ID (NSI-ID);

Destination information: e.g. Data network name (DNN(s)) of destination, Application ID, third party service provider, DNAI (Data Network Access Identifier);

Packet Filter Sets as defined in TS 23.501;

Time information: e.g. packet aggregation could be performed for specific periods during the day, weekdays;

Load of Network Function: If the load of a network function is above a threshold, the packet aggregation will be performed.

(R)AN location information: for example, packets sent to or from some (R)AN node (represented by (R)AN address (such as IP address or FQDN (Fully Qualified Domain Name)) may be sent over an aggregated tunnel;

UPF information: for example, packets sent to or from a UPF function (represented by UPF address (IP address or FQDN); and Specific policy instruction from a function of control plane, such as SMF or PCF: a CP function may send an instruction indicating using aggregated tunnel for packets of one of some or all QoS Flows of a PDU Session, for packets of group of PDU sessions, or packets of a UE group, or some other criteria.

The aggregation selection criteria will be discussed below with reference to FIG. 11.

The aggregated tunnel packet formats are described in more detail below, with reference to FIGS. 6-10. Note the same or different tunnel protocols can be applied to the UL and DL PDU packets. The same or different selection criteria may be used to select type of tunnel, per PDU session tunnel or aggregated tunnel, to send packets.

Figure 5:
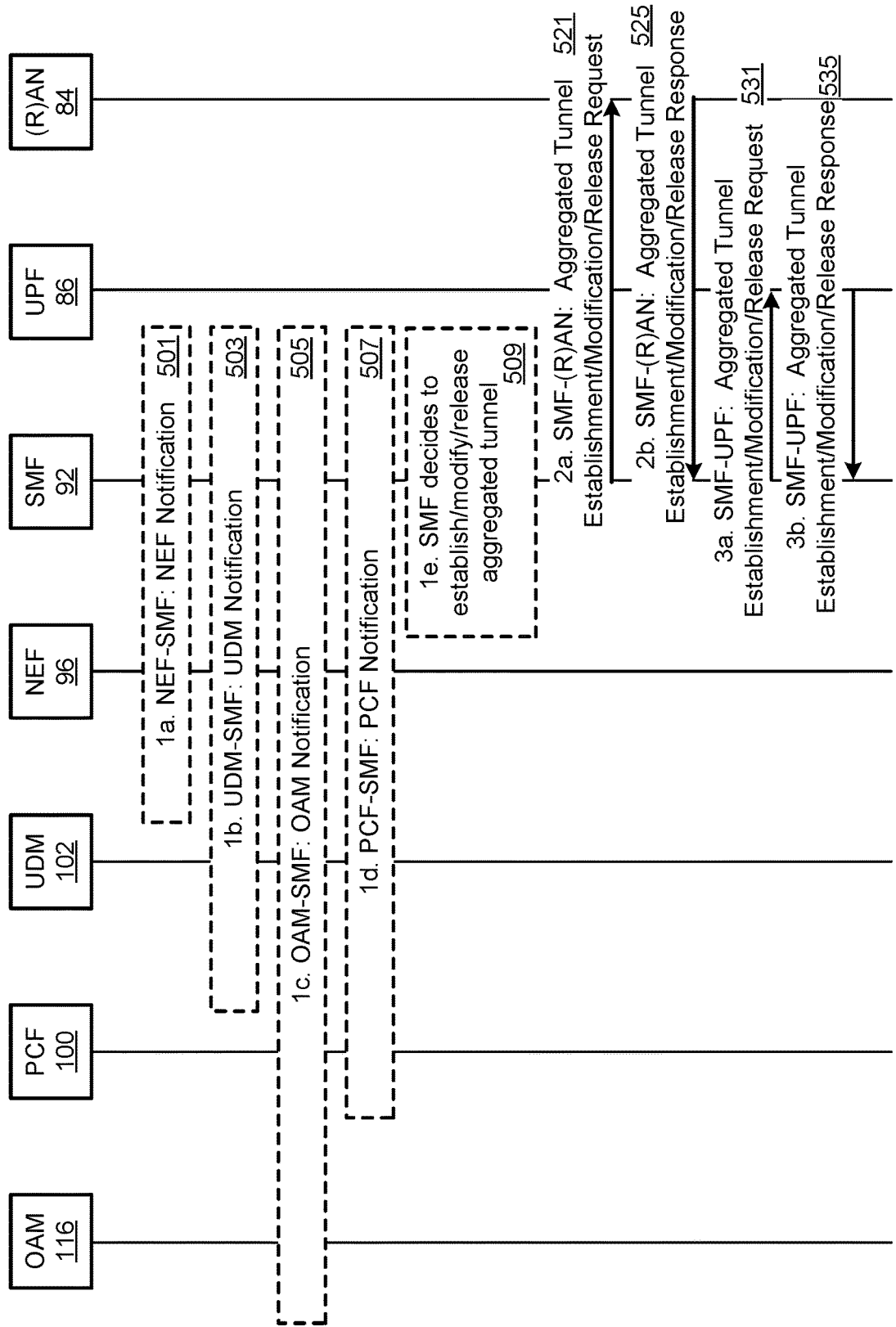
FIG. 5 illustrates a Signaling procedure to establish, modify, and release an Aggregated Tunnel, according to an embodiment.

FIG. 5 illustrates a signaling procedure relating to the status of an interface capable of using an aggregated tunnel according to an embodiment. It should be appreciated the term 'cause a change to the status of the interface with respect to the aggregated tunnel' includes establishing a new aggregated tunnel, or modifying or releasing an existing tunnel. In this example, an aggregated tunnel is established between a UPF 86 and a (R)AN 84, using an N3 interface. However it should be appreciated that the aggregated tunnel can be established between a UPF 86 and another UPF, including a PDU Session Anchor UPF 89 using an N9 interface, or a DN 88 using a N6 interface.

It should be appreciated that each network function 101, 120 of FIG. 4 includes an interface capable of using the aggregated tunnel. In some embodiments, this interface can be part of the PAF 112 or the D-PAF 122. In other embodiments, this interface is separate from the PAF 112 or D-PAF 122, in which case the PAF 112 sends the aggregated PDU to such an interface for network function 101, and the interface sends the aggregated PDU network function 122, and the D-PAF 122 of network function 122 processes the aggregated PDU.

It should be appreciated that the signaling procedure may be similar whether there is a request to initially establish an aggregated tunnel, or to modify or release an established aggregated tunnel. Furthermore, the order of steps may be different. For example, the SMF may configure the (R)AN 84 before or after configuring the UPF 86.

The procedure includes possible notifications described as steps 1a-1d (501-507) which triggers the SMF 92 to make decisions as step 1e (509). The SMF may also decide to make decision without triggers 1a-1d, based on some other triggers. After the SMF 93 makes decision 509, the procedure includes message exchanges between SMF 92 and the (R)AN 84 as steps 2a-b (521, 525) and message exchanges between SMF 92 and the UPF 86 as steps 3a-b (531, 535).

Steps 1a-1d (501-507) illustrate four possible notifications which can trigger the SMF 92 to determine whether to establish/modify/release an Aggregated Tunnel between two Network Functions, such as (R)AN 84 and UPF 86 in this example. As illustrated as step 1a: the NEF 96 can notify the SMF with triggering information 501, for example related to an Internal Group of UEs or in response to an Application Function (AF) 104 requesting application-influence traffic routing. The AF 104 may send a request to the NEF 96 to establish, or modify, or release one or multiple aggregated tunnels aggregated tunnel over the N6 interface for a UE Group (represented by, e.g. External Group ID). The AF 104 may include in the request at least any combinations of following information: External Group ID, UE information (UE IDs, e.g. GPSI, MSISDN or an External Identifier), traffic routing information, time information (e.g. time to establish, modify, or release an aggregated tunnel of N6 interface), location information of UEs (e.g. Geographical Zone ID), information on N6 tunnel (e.g. packet filter description, packet header information of packet (such as IP header), payload size), and QoS information (e.g. packet delay budget, maximum bit rate, priority). The SMF 92 may subscribe to notification service of the NEF 96 to receive notification for a specific UE Group, which may by represented by the Internal Group. The NEF 96 may have a mapping between External Group ID and Internal Group ID. Note that the Internal Group may include UEs of a person, a household, a family, an office, a factory, or some other organization or group. Or an Internal Group can include UEs of a particular network slices, or some other grouping characteristics, which for this purpose can lead to benefits for aggregating packets, such as a common destination, UE categories, device type, or characteristic (e.g., common QoS requirement). In response to the AF 104 request, the SMF 92 may establish, or modify, or release, one or multiple aggregated tunnels for each N3, N6, and N9 interfaces.

As illustrated as step 1b: the UDM 102 can notify the SMF with triggering information 503, for example related to the establishment, modification, or release of an Internal Group, subscription information.

As illustrated as step 1c: the Operation, Administration, and Maintenance (OAM) function 116 of the Network Management plane can notify the SMF with triggering information 505, for example about Network Function Connection Topology (logical and/or physical connections among (R)AN nodes and UP functions (UPF)), or an Internal UE Group.

As illustrated as step 1d, the PCF 100 can notify the SMF with triggering information 507, for example changes of PCC rules (e.g. QoS rules/policies, charging rules) of per PDU Session Tunnel and/or of Aggregated Tunnel. Alternatively, the PCF 100 may receive a request from the AF 104 to establish, modify, or release one or multiple aggregated tunnels for N6 interface. The AF 104 may include in the request at least any combinations of following information: External Group ID, Network Slice information (e.g. S-NSSAI, NSI-ID), UE information (e.g. UE IDs, (such as GPSI, MSISDN or an External Identifier), UE categories), traffic routing information, time information (e.g. time to establish, modify, or release an aggregated tunnel of N6 interface), location information of UEs (e.g. Geographical Zone ID), information on N6 tunnel (e.g. packet filter description, packet header information of packet (such as IP header), payload size), and QoS information (e.g. packet delay, maximum bit rate, priority). In response to the PCF 100 trigger, the SMF 92 may establish, or modify, or release, one or multiple aggregated tunnels for each N3, N6, and N9 interfaces.

Steps 1a-1d (501-507) are shown in dotted as they are optional, as one or more may not occur. Other network functions may also send trigger information to the SMF 92. For example, the Network Data Analytic Function (NWDAF) may send traffic analysis information to the SMF 92. The traffic information from the NWDAF may be, for example, statistics of traffic of NF, QoS parameters, such as packet size or PDB, of some applications (e.g. represented by Application IDs, packet filter description information), some destinations (e.g. represented by DNN, application identifier, or DNAI), some UEs (e.g. SUPI, GPSI), some network slices (e.g. S-NSSAI, NSI-ID), some (R)AN locations (e.g. (R)AN address(es)), some UPF.

Assuming a trigger event occurs, the SMF 92 determines whether to establish/modify/release an Aggregated Tunnel between two Network Functions. In some embodiments, the SMF 92 can make the decision 509 without receiving one of the triggers 501-507 based on other criteria. For example, the SMF may receive a pre-configured rule from NMF 116, or a default PCC rules, or dynamic PCC rules, to establish aggregated tunnel for any UE Groups, or any IoT devices, or any pair of UPNFs. For example, when the first UE of a UE Group requests a PDU session, the SMF 92 is notified by a network function of the UP or the CP and may establish an aggregated tunnel at the same time or after the SMF 92 establishes the N3 tunnel and/or N9 tunnel and/or N6 tunnel. Assuming the SMF 92 determines an action is warranted, the procedure continues with the remaining steps.

As illustrated as Step 2a: The SMF 92 sends a message, e.g. N2 SM Aggregated Tunnel Establishment/Modification/Release request message 521 to the (R)AN 84. The message can include one or more of:
CN Aggregated Tunnel information: UPF Address, and UL Tunnel Endpoint Identifier (TEID) if the SMF 92 is in charge of generating UL TEID,
UL and DL Aggregated Tunnel protocols (as discussed below):
QoS Information of aggregated tunnel: which may be similar to the QoS parameters and characteristics of a QoS flow described in TS 23.501. For example, the aggregated packets sent between two NFs may have priority level, resource type, maximum bit rate, guaranteed bit rate, maximum guaranteed bit rate, packet delay budget, averaging window, and other parameters;
Criteria to select PDU packets of PDU Sessions to send over Aggregated Tunnel using at least any combinations of the following information:
UE information: e.g. UE ID(s), 5G SUPI, GPSI (Generic Public Subscription Identifier) MSISDN, External Identifier, UE Category (e.g. narrow-band IoT devices);
Tunnel Endpoint ID (TEID(s)) of per PDU Session tunnel(s)
Individual packet size;
UE Group information: E.g. Internal Group Identifier(s), External Group Identifier;
QoS of PDU Sessions: Packet delay budget, packet size, 5QI, QoS Flow Identifier (QFI) resource type, priority level, etc.
PDU Session Type;
Network Slice information, e.g. Single Network Slice Selection Assistance Information (S-NSSAI, NSI-ID);
Destination information: e.g. Data network name (DNN(s)) of destination, Application ID, third party service provider;
Packet Filter Sets as defined in TS 23.501;
Time information: e.g. packet aggregation could be performed for specific periods during the day;
Load of Network Function: If the load of a network function is above a threshold, the packet aggregation will be performed.
(R)AN location information: for example, packets sent to or from some (R)AN node (represented by (R)AN address (such as IP address or FQDN (Fully Qualified Domain Name)) may be sent over an aggregated tunnel;
UPF information: for example, packets sent to or from a UPF function (represented by UPF address (IP address or FQDN); and
Specific policy instruction from a function of control plane, such as SMF or PCF: a CP function may send an instruction indicating using aggregated tunnel for packets of one of some or all QoS Flows of a PDU Session, for packets of group of PDU sessions, or packets of a UE group, or some other criteria.

As illustrated as Step 2b: The (R)AN 84 may send to the SMF 92 the Aggregated Tunnel Establishment/Modification/Release response 525. This message can include the DL Aggregated Tunnel information, including the (R)AN Address and TEID of the Aggregated Tunnel.

It is understood that the messages between SMF 92 and (R)AN 84 are sent through an AMF 90, although the AMF 90 is not shown in FIGS. 4 and 5 for simplicity. The AMF 90 may establish a logical link with the (R)AN 84 to send and receive messages from the (R)AN 84 related to the aggregated tunnel. For example, the AMF 90 establish an N2A interface with the (R)AN 84, in which unique identifiers are used to represent the logical connections from the AMF 90 to (R)AN 84; and from (R)AN 84 to AMF 90. To establish an aggregated tunnel in (R)AN 84, the SMF 92 may send an Aggregated Tunnel Establishment request 521 destined to (R)AN address, via the AMF 90. After receiving this message, the AMF 90 may read the message, and establish a new N2A logical interface with the (R)AN 84. The N2A interface may be the same as an N2 interface. The AMF 90 may also use an existing N2A interface for exchanging messages related to a new aggregated tunnel with the (R)AN 84. Then the AMF 90 forwards the message 521 from the SMF 92 to the (R)AN 84 on the N2A interface. After establishing the aggregated tunnel, the (R)AN 84 sends the Aggregated Tunnel Establishment response 525 to the SMF 92, via the AMF 90 on the interface N2A.

As illustrated as Step 3a: The SMF 92 may send a message, e.g. N4 message Aggregated Tunnel Establishment/Modification/Release request 531 to the UPF 86. This message can include one or more of:
(R)AN Aggregated Tunnel information received from (R)AN: (R)AN Address and DL TEID.
UL TEID of Aggregated Tunnel if the SMF 92 is in charge of generating UL TEID;
UL and DL Aggregated Tunnel protocols as discussed below:
QoS Information of aggregated tunnel: which may be similar to the QoS parameters and characteristics of a QoS flow described in TS 23.501. For example, the aggregated packets sent between two NFs may have priority level, resource type, maximum bit rate, guaranteed bit rate, maximum guaranteed bit rate, packet delay budget, averaging window, and other parameters.

Criteria to select PDU packets of PDU Sessions to send over Aggregated Tunnel using any combinations of the following information:
  UE information: e.g. UE ID(s), 5G SUPI, GPSI (Generic Public Subscription Identifier) MSISDN, External Identifier, UE Category (e.g. narrow-band IoT devices);
  Tunnel Endpoint ID (TEID(s)) of per PDU Session tunnel(s)
  Individual packet size;
  UE Group information: E.g. Internal Group Identifier(s), External Group Identifier;
  QoS information of PDU Sessions: e.g. priority level, resource type, Packet delay budget, packet size, 5QI, QoS Flow Identifier (QFI).
  PDU Session Type;
  Network Slice information, e.g. Single Network Slice Selection Assistance Information (S-NSSAI);
  Destination information: e.g. Data network name (DNN(s)) of destination, Application ID, third party service provider;
  Packet Filter Sets as defined in TS 23.501;
  Time information: e.g. packet aggregation could be performed for specific periods during the day;
  Load of Network Function: If the load of a network function is above a threshold, the packet aggregation will be performed.
  (R)AN location information: for example, packets sent to or from some (R)AN node (represented by (R)AN address (such as IP address or FQDN (Fully Qualified Domain Name)) may be sent over an aggregated tunnel;
  UPF information: for example, packets sent to or from a UPF function (represented by UPF address (IP address or FQDN)
  Specific policy instruction from a function of control plane, such as SMF or PCF: a CP function may send an instruction indicating using aggregated tunnel for packets of one of some or all QoS Flows of a PDU Session, for packets of group of PDU sessions, or packets of a UE group, or some other criteria;
  CM state and RRC state, e.g. UE is in CM-CONNECTED state and RRC-INACTIVE state; UE is in CM-IDLE state; and
  a notification of the UEs currently in MICO (Mobile Initiated Connection Only) mode.

As illustrated as Step 3b: The UPF 86 sends an N4 message Aggregated Tunnel Establishment/Modification/Release response 535 to the SMF 92 to acknowledge the request of SMF in step 3a. If the UPF 86 is in charge of generating UL TEID, the UPF 86 includes the UL TEID and the response message 535. In this case, the SMF 92 may need to send the UL TEID to the (R)AN 84 by using N2A Aggregated Tunnel Modification request.

Before sending the first message related to a new aggregated tunnel to the UPF 86, e.g. N4 message Aggregated Tunnel Establishment request 531, the SMF 92 may establish a new logical link, for example N4A interface, or use an existing logical interface, for example N4 Node Level association, with the UPF 86 to exchanges messages with the UPF 84 related to the aggregated tunnel. Other subsequent messages related to the aggregated tunnel shall be sent on the same interface, e.g. N4A.

It should be appreciated that each of the (R)AN 84 and the UPF 86 may be configured with the PAF 112 and D-PAF 122 functions described above with reference to FIG. 4. In which case, these functions can be the sender and receiver of the messages (521, 525, 531 and 535) described above.

FIG. 6 illustrates an example format of aggregated tunnel packets, according to an embodiment. FIG. 7 illustrates the format of the Aggregated Encapsulation Header of FIG. 6, according to embodiment. Each PDU packet is encapsulated using a PDU Encapsulation Header for each packet within the payload of the frame illustrated in FIG. 6 FIG. 8 illustrates the format of each PDU Encapsulation Header of FIG. 6, according to embodiment.

Regarding the Aggregated Encapsulation Header of FIG. 7, a brief summary of the fields includes:
  PDU Type: Indicates whether this PDU is an Aggregated PDU or a single PDU.
  Tunnel Endpoint Identifier of PDU: It is used for receiving endpoint to identify PDU packets belonging to an Aggregated Tunnel.
  QoS Information: Indicates QoS treatment of Aggregated PDU.
  Length of PDU: Length of Aggregated PDU.
  Sequence Number: It is optional, used to indicate the sequence number of PDU sent over Aggregated Tunnel.

It should be appreciated that additional fields can be included as needed, depending on the application. For example additional fields used in the GTP-U tunnel protocol can be included. It is noted that the Aggregated Encapsulation Header of FIG. 7 includes a PDU type field. The PDU Type may be indicated in Message Type of GTP-U protocol. Alternatively, in some embodiments, instead of including the PDU Type as part of the PDU Encapsulation Header, the PDU Type can be stored in the UE Context in network functions, such as in (R)AN, UPF, and SMF. Thus in such embodiments, the PDU Type may not be sent in the PDU Encapsulation Header.

Regarding the PDU Encapsulation Header of FIG. 8, a brief summary of the fields includes:
  PDU Type: Indicates whether this PDU is single PDU of a QoS Flow.
  Tunnel Endpoint Identifier of PDU: It is used for receiving endpoint to identify PDU packets belonging to a PDU session of a UE.
  QoS Information: Indicates QoS treatment of single PDU, for example QFI or 5QI.
  Length of PDU: Length of PDU (PDU Header and PDU Payload).
  Sequence Number: It is optional, used to indicate the sequence number of PDU sent over the per PDU session tunnel of PDU session.

Once again, it should be appreciated that additional fields can be included as needed, depending on the application. For example additional fields used in the GTP-U tunnel protocol can be included. It is noted that the PDU Encapsulation Header of FIG. 8 includes a PDU type field. Alternatively, in some embodiments, instead of including the PDU Type as part of the PDU Encapsulation Header, the PDU Type can be stored in the UE Context in network functions, such as in (R)AN, UPF, SMF. Thus, in such embodiments, the PDU Type may not be sent in the PDU Encapsulation Header.

The QoS parameters of such an aggregated tunnel will now be discussed. The embodiment of FIG. 6 allows for an Aggregated Tunnel to carry PDUs of different PDU sessions The UPF, or in some embodiments a PAF within the UPF receives instructions from the SMF to select PDU packets of different PDU sessions. For example, PDUs may be allocated to an aggregated tunnel based on the packet delay budgets of the individual QoS Flows of PDU Sessions. The QoS parameters of Aggregated Tunnel may include the following parameters:

Aggregated Tunnel Resource Type: for example Non-GBR (guaranteed bit rate) or GBR, or delay critical GBR;

Aggregated Tunnel Priority Level;

Aggregated Tunnel Packet Delay Budget: The packet delay between two Network Functions, such as between (R)AN and PDU Session Anchor (PSA) UPF;

Aggregated Tunnel Packet Error Rate (AT-PER): Should be calculated with respect with the Packet Error Rate requirements of individual QoS flows of PDU Sessions to meet the require PER of individual QoS flows of PDU sessions;

Aggregated Tunnel Maximum Bit Rate (AT-MBR): the maximum bit rate of aggregated tunnel that the NF support in case the Resource Type is non-GBR;

Aggregated Tunnel Guaranteed Bit Rate (AT-GBR): the minimum bit rate that the NF guarantees to support in case the Resource Type is GBR;

Aggregated Tunnel Maximum Guaranteed Bit Rate (AT-MGBR): The maximum bit rate that the NF guarantees to support in case the Resource Type is GBR;

Averaging window: the time window used to measure the AT-MBR, AT-GBR, AT-MGBR of aggregated tunnel. There may be one, or two, or more Averaging window to measure different QoS parameters and characteristics of aggregated tunnel.

Aggregated Tunnel Maximum Data Burst Size (AT-MDBS): for delay critical resource type, the AT-MDBS denotes the largest amount of data that the 5G-AN is required to serve within a period of 5G-AN PDB (i.e. 5G-AN part of the PDB). (5G-AN stands for 5G Access Network).

In some embodiments, the AT-MBR, AT-GBR, AT-MGBR may not be specified. For example, when PDU packets of a PDU session may be sent over a per PDU session tunnel or over another aggregated tunnel, the NF (such as (R)AN 84 and UPF 86) may de-aggregate PDU packets first, and may send the de-aggregated PDU packets to the packet queues of the corresponding QoS flows of the PDU sessions. Then a QoS monitoring and enforcement function at the NF may perform rate enforcement on the packet queue of the PDU session or QoS flow according to the QoS policies for individual QoS flows and PDU sessions.

In some embodiments, the AT-MBR, AT-GBR, AT-MGBR may be specified. For example, when the aggregated tunnels is established to send all packets of a UE group from the (R)AN 84 to UPF 86. The UPF 86 may perform traffic monitoring and rate enforcement for the packet send on this aggregated tunnel.

In some embodiments, the AT-MBR, AT-GBR, AT-MGBR may be specified. The packets of a PDU session of a UE may be sent over either aggregated tunnel or per PDU session tunnel. The NF may perform rate measurements and enforcement for both aggregated tunnel and per PDU session tunnel jointly, or independently.

One benefit of the above described approach is the flexibility provided to the network, as the Network (UP) Function can send PDU to another Network Function using either a Per PDU Session tunnel or an Aggregated Tunnel. An Aggregated Tunnel can reduce the overhead of outer IP and L1/L2 layers, as there is only one IP and L1/L2 header shared for N PDU packets within an Aggregated Tunnel packet. Note only is the overhead reduced, thus reducing bandwidth consumption, but such an approach can also reduce packet processing load of the physical routers and UP Network Functions. Such a method can be used for both UL and DL PDU packets.

Further, as the single PDU Encapsulation Header is preserved in the Aggregated Tunnel, the receiving Network Function can handle individual PDUs of different PDU Sessions according to the QoS of each PDU. Further such an approach allows for packet aggregation and re-aggregation by intermediate UPFs (if a PDU is routed through a series of UPFs). Accordingly, in some embodiments, such an approach allows PDUs to be de-aggregated by an D-PAF of an intermediate UPF, and then re-aggregated, with the re-aggregation in some cases being different than the received aggregation. For example a D-PAF can receive packets from an aggregated tunnel, and use the individual PDU encapsulation headers to provide a different treatment in forwarding the individual packets. For example some of the received packets from an aggregated tunnel can be forwarded using a Per PDU session tunnel, whereas others can be allocated to additional aggregated tunnel. Further in some embodiments the intermediate UPF can split individual packets from a received aggregated tunnel into two or more output aggregated tunnels.

Figures 9, 10:
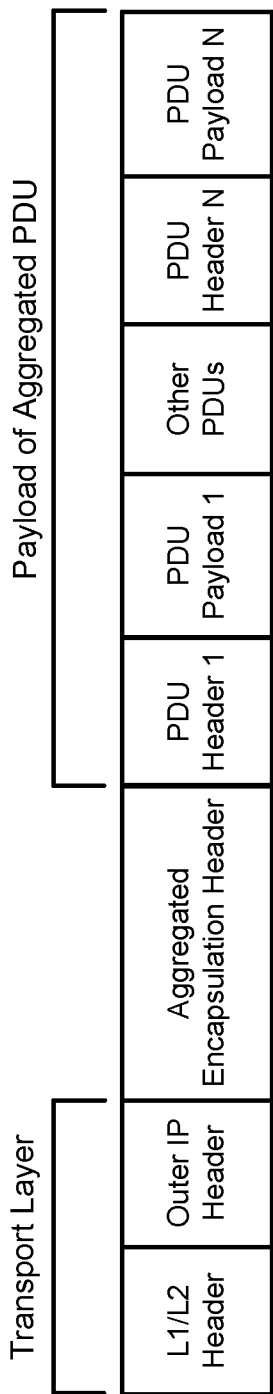
FIGS. 9 and 10 illustrate an alternative aggregated tunnel frame format, according to an embodiment.

FIGS. 9 and 10 illustrate an alternative aggregated tunnel packet format, according to an embodiment. Such an approach further reduces the overhead by eliminating the PDU Encapsulation Headers for each PDU packet. This model is suitable for certain scenarios, for example for UL packets from multiple UEs each having the same QoS requirements and destination (e.g., each directed to a common Application Server). This scenario can be useful, for example, for a utility company which has a large number of meters sending small meter reading packets to a single server. As another example, such a format can be used for DL packets directed to multiple IoT devices, where the receiving Network Function, such as a (R)AN node, can read the PDU Header and classify PDUs according to the destination UE or based on the QoS flows.

FIG. 9 illustrated the tunnel format, whereas FIG. 10 illustrates the Aggregated Encapsulation Header field, according to an embodiment. As illustrated, the Aggregated Encapsulation Header field includes the following fields:

PDU Type: Indicates whether this PDU is Aggregated PDU or a single PDU.

Tunnel Endpoint Identifier of PDU: It is used for receiving endpoint to identify PDU packets belonging to an Aggregated Tunnel.

QoS Information: Indicates QoS treatment of Aggregated PDU.

Number of PDUs: Indicates the number of PDUs in the aggregated PDU.

Length of PDU n: Length of each PDU.

Sequence Number: It is optional, used to indicate the sequence number of aggregated PDU sent over Aggregated Tunnel.

It should be appreciated that additional fields can be included as needed, depending on the application. For example additional fields used in the GTP-U tunnel protocol can be included, example Extension Header field to carry sequence numbers of individual PDUs that are sent in Aggregated Tunnel. It is noted that the Aggregated Encapsulation Header of FIGS. 6 and 9 includes a PDU type field. The PDU Type may be indicated in Message Type of GTP-U protocol. Alternatively, in some embodiments, instead of including the PDU Type as part of the PDU Encapsulation Header, the PDU Type can be stored in the UE Context in network functions, such as in (R)AN, UPF, and SMF.

Accordingly, the PDU type is part of tunnel information, and indicates whether the PDU is transmitted using an Aggregated PDU or a single PDU. In some embodiments, the PDU type could be stored in the UE Context.

The QoS parameters of such an aggregated tunnel are similar to those described for FIG. 7.

Figure 11:
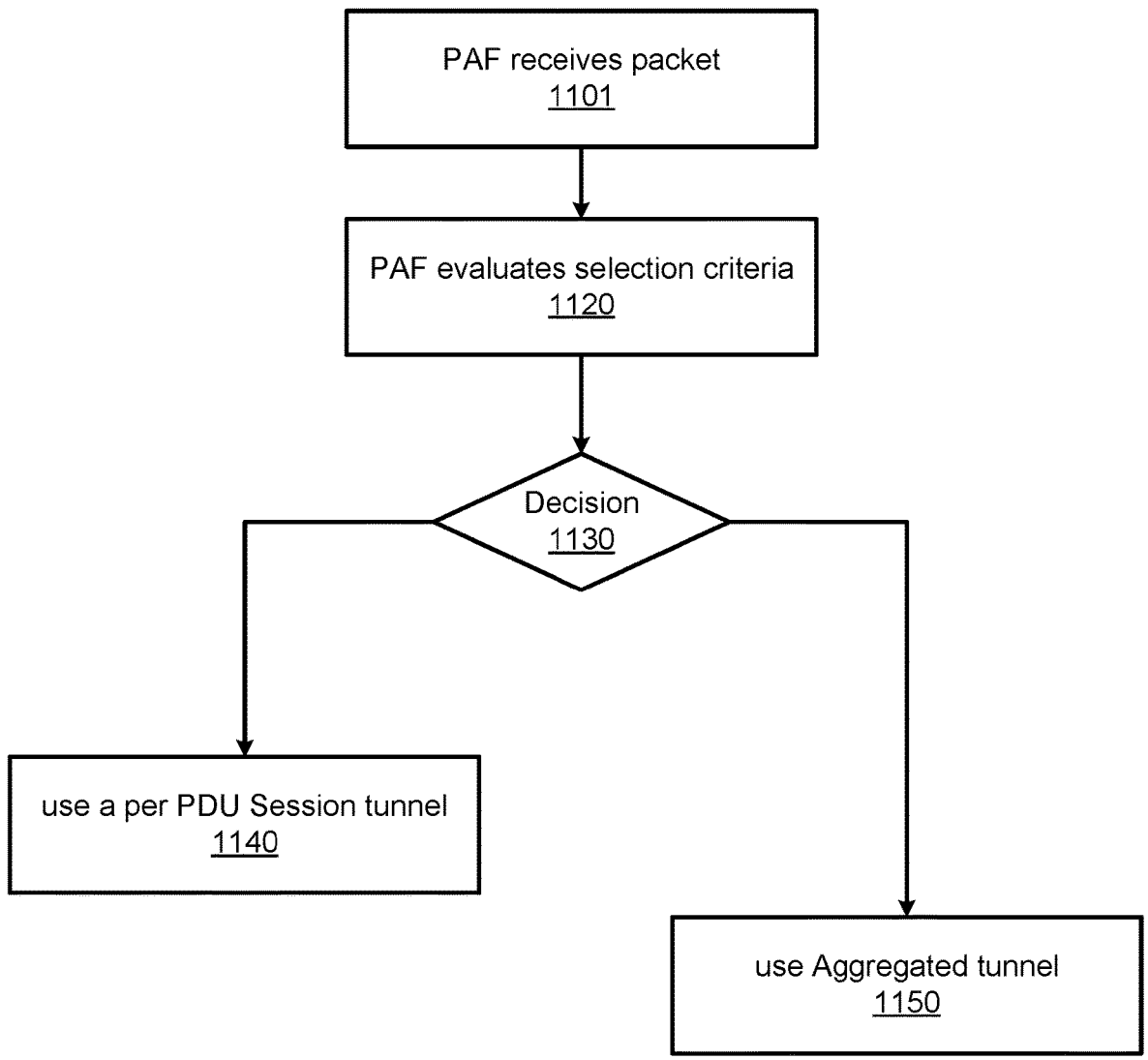
FIG. 11 illustrates a process executed by the PAF in determining the type of tunnel to use for an incoming PDU, according to an embodiment.

FIG. 11 illustrates a process executed by the PAF in determining the type of tunnel to use for an incoming PDU, according to an embodiment. In other words, FIG. 11 illustrates a process of determining when to use packet aggregation. During operation, upon receiving a PDU packet 1101 the PAF of the NF evaluates the packet with the above described aggregation selection criteria 1120, to determine whether to use a per PDU Session tunnel 1140 or an Aggregated Tunnel 1150 to send the PDU packet. For example:

By the time the UP Network Function decides to send the PDU packet, if there is only 1 PDU Packet to be sent, the UP Network Function may use per PDU Session Tunnel protocol.

By the time the UP Network Function decides to send the PDU packet, if there are other PDU packets that can be sent over the Aggregated Tunnel, the UP Network Function may select the Aggregated Tunnel Protocol to send multiple PDU packets.

In some embodiments, there may be only one or more aggregated tunnels and no per PDU session tunnel. In which case, the PDU packets are always sent by Aggregated Tunnel. Further, in some embodiments the PAF can additionally determine the type of aggregated tunnel to be used. For example, whether to use the format of FIG. 6 or the Format of FIG. 9.

The PAF and DPAF may have an Aggregated Tunnel Context to store all the information related to the Aggregated Tunnel, including at least any combinations of the following information:

Receiving NF address and Aggregated Tunnel Endpoint ID of both UL and DL;

Individual TEIDs of per PDU Sessions, which having packets of QoS Flows carried by the Aggregated Tunnel;

QoS Information of Aggregated Tunnel;

QoS Information of individual QoS Flows of PDU Sessions;

List of UE IDs (e.g. SUPI, 5G GUTI, GPSI) that having packets carried by the Aggregated Tunnel;

Instruction from SMF for selecting packets of UEs to send in the Aggregated Tunnel, and PDU Session Type (e.g. IP PDU Session Type (IPv4 or IPv6), Ethernet PDU Session, Unstructured PDU Session).

While the above examples discuss packet aggregation in the UP, some embodiments utilize similar techniques in the control plane (CP). For example, some embodiments can utilize similar packet aggregation as a CP solution to deliver IoT data packets and signaling messages between RAN nodes (e.g, eNB) and CP functions (e.g., an MME in 4G networks, AMF in 5G networks) to reduce CP congestion. Note that generally, the messages sent between CP functions can be carried by existing or new service-based interface messages as described in 3GPP TS 23.502, published in December 2017.

Some of the features of the embodiments described above with reference to FIGS. 1-11 may be summarised as follows:

Introduction

In RAN and UPF, and physical routers, the packet processing time is proportional to the number of incoming and outgoing packets. Furthermore, the packet header added by IP and lower layer can be significant compared to the payload. Hence reducing the number of small packets in the network can reduce the processing load of network functions and physical routers.

One possible method to reduce the number of small packets is to employ packet aggregation. Small packets can be aggregated by (R)AN nodes and anchor UPF so that many small PDUs can be aggregated into a larger PDU. The aggregated PDU can be sent between a (R)AN node and an anchor UPF, or between UPF and DN, or between a (R)AN and DN. This will reduce the processing load requirements of intermediate UPF and physical routers, which ultimately reduces the cost of network functions, physical routers.

Functional Description

The small packets are sent between two network functions as shown in FIG. 4. In some contexts, the D-PAF 122 may be referred to as a Packet De-aggregation Function (PDF). The network function could be a (R)AN node and UPF, or NEF if the NEF is used to deliver small packets to Application Server. The UPF could be any CN UP functions that can be used for sending PDU such as an intermediate UPF (I-UPF), an anchor UPF, a Branching Point (BP), or a UL Classifier (UC).

Small PDUs are aggregated by a function, for example Packet Aggregation Function (PAF), in network function 1. At network function 2, the aggregated packets are de-aggregated by a function, for example Packet De-Aggregate Function (PDF). For example, the SMF would establish a separate N3 tunnel between a (R)AN node and a UPF, or a separate N9 tunnel between two UPFs, or a separate tunnel between a UPF and DN to transfer aggregated PDU.

AMF Selection to Serve IoT UE Group

When the UE performs registration procedure, the (R)AN may be configured by the OAM (Operation, Administration, and Maintenance) to select a default AMF for a specific requested NSSAI or UE IDs that belong to a UE Group ID. Alternatively, the (R)AN may select an AMF which is not the same as the AMF serving a UE Group of IoT devices. This AMF can perform AMF reselection to make sure that the same AMF is selected to serve all the IoT devices of a UE group in a geographical area. The AMF may be configured by the OAM to serve UE Group(s). Alternatively, the AMF may access the NRF to discover other AMF instances. The NRF may have information on which AMF instance is configured to serve with which UE Group(s). The UDM has UE Group information of IoT devices, which consists of UE IDs of the UE Group. The AMF can obtain the UE Group information when the UE register to the CN.

SMF Selection to Serve IoT UE Group

The AMF is configured such that in a geographical area, all the PDU Sessions of UEs, such as IoT devices, belonging to one UE Group are served by the same SMF. When UEs, such as IoT devices, perform registration procedure, the AMF obtains the UE Group information from the UDM. The AMF selects the same SMF by local configuration or by accessing NRF and/or NSSF.

PDU Aggregation Criteria

The SMF sends to UP network function the PDU aggregation criteria. This criteria can be included in an Aggregated Tunnel Establishment(/Modification) request message. In some embodiments, this message includes criteria for selecting PDUs for aggregation within the aggregated PDU. In some embodiments, the criteria includes the UE context of the UE group. The criteria for PDU aggregation at the UP network function may be one or more of following information UE IDs of a UE group: The UL PDUs are sent to the same Application Server, the DL PDUs are sent to the same (R)AN node;
PDU Session ID(s) of UE ID;
QFI(s) of QoS Flows of PDU Sessions of a given UE;
Packet Delay Budget (PDB);
PDU size limit of individual PDU;
Maximum Size of Aggregated PDU.

Based on the PDB of QoS Flows, the UP network function sends the aggregated PDU to meet the PDB requirements of all individual PDUs.

If one PDU has size larger than the PDU size limit, the UP network function may send this PDU on the per-PDU Session tunnel instead of sending this PDU on the aggregated tunnel.

Procedures

Aggregated Packet Format

The format of aggregated packet is provided in FIGS. 6-8. The format of Aggregated Encapsulation Header may be the same as the format of per PDU N3/N9 Encapsulation Header. The new field "PDU Type" indicates whether the payload is a single PDU or aggregated PDU. This indication can be stored in the UP network function as part of tunnel context information.

The PDU Encapsulation Header and the Aggregated Encapsulation Header are GTP-U tunnel header specified in TS 29.281.

The N3 tunnel of PDU Session has a unique TEID.

The Aggregated Tunnel also has a unique TEID.

Functionalities of (R)AN to Support Packet Aggregation

The (R)AN receives the PDU aggregation criteria from the SMF. The (R)AN may store the PDU aggregation criteria, for example in the configuration parameters of PAF. The (R)AN may store one or more of following information as part of PDU Session context of (R)AN UE Context:

An Indication to use an aggregation tunnel for a QoS Flow (indicated by QFI) of PDU Session,
N3 UL Aggregated Tunnel information (UPF Address and UL Aggregated TEID), and
N3 DL Aggregated Tunnel information (UPF Address, DL Aggregated TEID).

In the uplink, when the (R)AN receives an UL PDU from the radio interface, the (R)AN adds the N3 per PDU Session Tunnel Header to the UL PDU. Then the (R)AN forwards the N3-encapsulated PDU to the PAF. The PAF performs the following tasks:

Receives N3-encapsulated PDU of individual QoS Flows;
Aggregates N3-encapsulated PDUs according to the Maximum Size of Aggregated PDU;
Adds N3 Aggregated Encapsulation Header to the Aggregated PDU;
Sends the Aggregated PDU to the UPF according to the PDB of individual PDUs in the aggregated payload.

In the downlink, when the (R)AN receives an aggregated PDU from an aggregated downlink tunnel, the (R)AN forwards the aggregated PDU to the PDF. The PDF performs the following tasks:

Receives the N3 DL Aggregated PDU;
De-aggregates the aggregated PDU by reading the N3 Aggregated Encapsulation Header and PDU Encapsulation Headers;
Sends the N3-Encapsulated PDU to the a function in (R)AN that maps the DL PDU to Data Radio Bearers.

Functionalities of UPF to Support Packet Aggregation

The UPF receives the PDU aggregation criteria from the SMF. The UPF may store the PDU aggregation criteria as configuration parameters of PAF. The UPF may store one or more of following information as part of PDU Session Context of UPF UE Context.

An Indication to use aggregation tunnel for a QoS Flow (for example indicated by QFI) of PDU Session,
N3 and/or N9 DL Aggregated Tunnel information ((R)AN Address and DL Aggregated TEID), and
N3 and/or N9 UL Aggregated Tunnel information ((R)AN Address, UL Aggregated TEID).

In the downlink, when the UPF receives an DL PDU from the N6 interface, the UPF performs packet classification based on Service Data Flow (SDF) template. The UPF adds N3 per PDU Session Tunnel Header to the DL PDU. Then the UPF forwards the N3/N9-encapsulated PDU to the PAF. The PAF performs the following tasks:

Receives N3-encapsulated PDU of individual QoS Flows;
Aggregates N3-encapsulated PDUs according to the Maximum Size of Aggregated PDU;
Adds N3/N9 Aggregated Encapsulation Header to the Aggregated PDU;
Sends the Aggregated PDU to the (R)AN according to the PDB of individual PDUs in the aggregated payload.

In the uplink, when the UPF receives an aggregated PDU from an aggregated uplink tunnel, the UPF forwards the aggregated PDU to the PDF. The PDF performs the following tasks:

Receives UL Aggregated PDUs;
De-aggregates the aggregated PDU by reading the N3/N9 Aggregated Encapsulation Header and PDU Encapsulation Headers;
Sends the N3/N9-Encapsulated PDU to a function in the UPF that maps the UL PDU to N6 interface.

In case an I-UPF is required, the SMF assigns N3 UL TEID for each PDU session, which is set the same as the N9 UL TEID. The SMF also assigns N9 DL TEID for each PDU session, which is set the same as the N3 DL TEID assigned by the (R)AN. Hence the I-UPF does not need to de-aggregate PDUs and re-aggregate PDU to replace the TEIDs of N3 and N9 UL/DL tunnels.

As an example, the packet aggregation and de-aggregation can be performed as follows.

First, the SMF establishes PDU sessions for several UEs as specified in clause 4.3.2 of TS 23.501.
The SMF sends packet aggregation criteria to the involved network functions.
In uplink:
The (R)AN receives a UL PDU of a QoS flow of a UE from radio interface.
The (R)AN creates N3 PDU Encapsulation Header and attaches it to the PDU.
The (R)AN decides that the N3-encapsulated PDU can be sent in the aggregated tunnel. The conditions to aggregate PDUs have been informed by the SMF and stored in the (R)AN.
The PAF in (R)AN aggregates N3-encapsulated PDUs into an aggregated packet.
The PAF in (R)AN creates Aggregated Encapsulation Header for aggregated packet.
The (R)AN sends the aggregated PDU to the UPF over an N3 tunnel.
The UPF receives the aggregated PDU, reads the header of aggregated PDU.
The UPF separates N3-encapsulated PDUs, reads the N3 Encapsulation header and sends PDUs to corresponding buffers of QoS flows.
The UPF forwards the PDU to the DN.

In downlink, the packet aggregation/de-aggregation process can be performed similar as in the UL.
  The UPF receives DL PDU from N6 interfaces and maps the PDU to a QoS Flow.
  The UPF creates N3 PDU Encapsulation Header and attaches it to the PDU.
  The UPF decides that the N3-encapsulated PDU can be sent in the aggregated tunnel. The conditions to aggregate PDUs are informed by the SMF.
  The PAF in UPF aggregates N3-encapsulated PDUs into an aggregated packet.
  The PAF in UPF creates Aggregated Encapsulation Header for the aggregated packet.
  The UPF sends the aggregated PDU to the (R)AN over an N3 tunnel.
  The (R)AN receives the aggregated PDU, reads the header of aggregated PDU.
  The (R)AN separates N3-encapsulated PDUs, reads the N3 Encapsulation header and sends PDUs to corresponding buffers of QoS flows.
  The (R)AN forwards the PDU to the UE.

If one or multiple intermediate UPF (I-UPF) is required, the SMF may assign the same UL TEID for per-PDU Session tunnels from the (R)AN to the I-UPF, from the I-UPF to another I-UPF, and from the I-UPF to the anchor UPF. The SMF may use the same DL TEID for per-PDU Session tunnel assigned by the (R)AN for the DL per-PDU Session tunnel from the I-UPF to the (R)AN, and for the DL per-PDU session tunnels from an I-UPF to another I-UPF, and for the per-PDU Session tunnel from the anchor UPF to the I-UPF. Using this setting, the I-UPF may not need to de-aggregate to replace the TEID in the N3 PDU Encapsulation Header of individual PDUs when forwarding aggregated PDUs between two UP network functions.

If one or more I-UPF is required, the SMF may assign the same UL TEID for the N3 UL aggregated tunnels from the (R)AN to the I-UPF, for the N9 UL aggregated tunnel from the I-UPF to another I-UPF, and for the N9 UL aggregated tunnel from the I-UPF to the anchor UPF. The SMF may use the DL TEID assigned by the (R)AN for the N3 DL aggregated tunnel from the I-UPF to the (R)AN for other N9 DL aggregated tunnels from the anchor UPF to the I-UPF, and from the I-UPF to another I-UPF. In this setting, the I-UPF does not need to replace the TEID in the Aggregated PDU header when forwarding aggregated PDUs between two UP network functions.

Aggregated Tunnel Establishment

Figure 12:
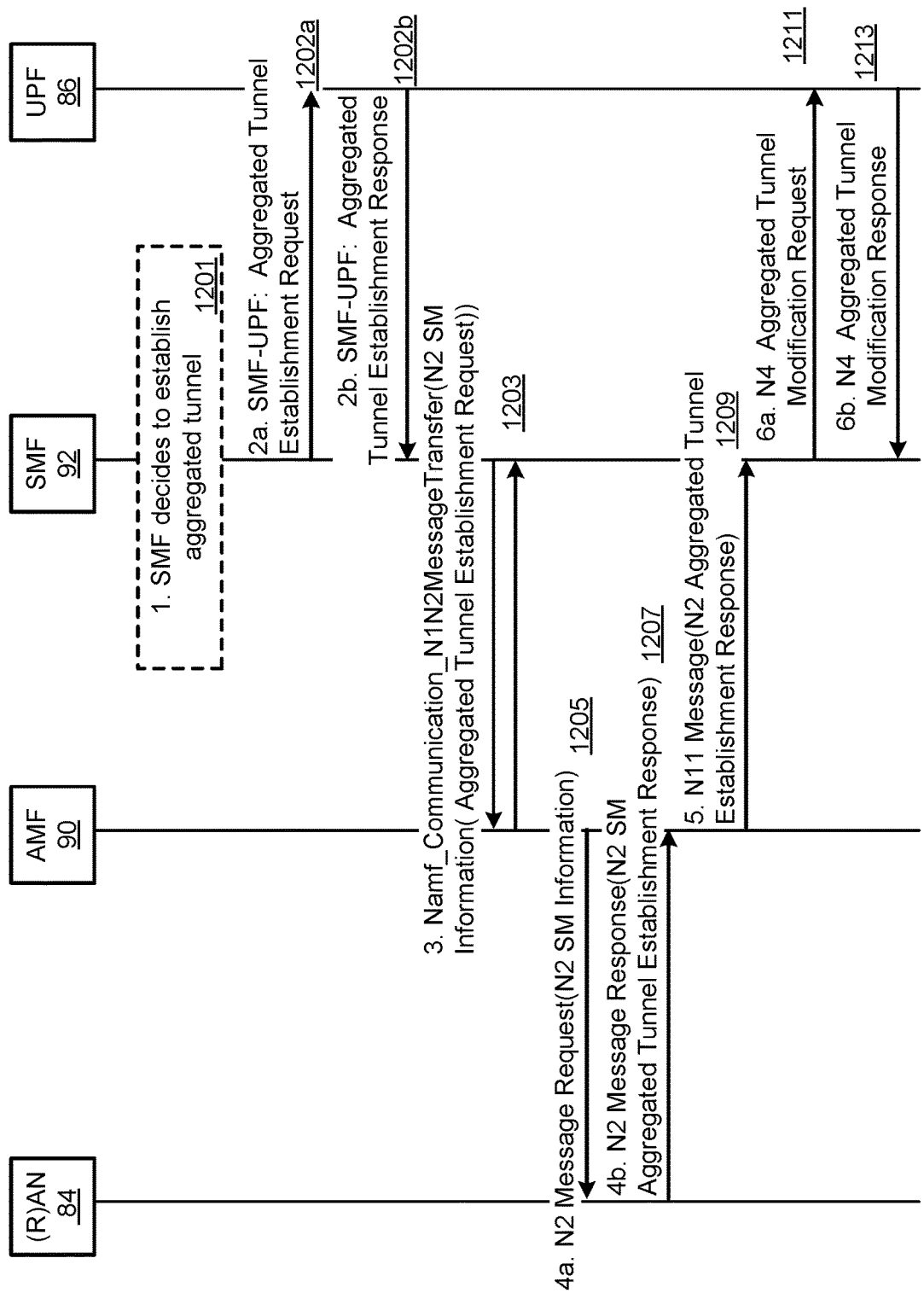
FIG. 12 is a message flow diagram illustrating an example aggregated tunnel establishment process.

FIG. 12 illustrates an alternative to the procedure illustrated in FIG. 5. This procedure is used by the SMF to establish UL and DL aggregated tunnels for some QoS Flows of some UEs. The triggers discussed above with reference to FIG. 5 can also apply to FIG. 12. The steps in the procedure include:

Step 1, illustrated at 1201: The SMF decides to establish aggregated tunnel between a (R)AN node and UPF for a UE Group. The SMF can establish the aggregated tunnel based on a number of possible triggers, including those discussed above and by one of following triggers:
  After the SMF establishes PDU Session of one or more UEs of a UE Group;
  The AF sends a request to a core network function, such as the PCF directly or via the NEF, to support a UE Group for traffic routing or event notifications; The PCF may send traffic routing policy related to the UE Group to the SMF;
  The UDM may send the UE Group information to the SMF;
  The NWDAF may send traffic statistics of a UE Group to the SMF; The traffic statistics may be traffic volume, such as the number of bytes, or the number of octets, or number of packets, of a UE Group sent between a (R)AN node and a UPF in a certain period, the packet rate (number of packets per second);

Step 2a: The SMF sends N4 Aggregated Tunnel Establishment Request 1202a to the UPF. The message may include one or more of following information: UE Group Information (e.g. UE Group ID), UE information of UEs in the UE Group, CN Tunnel Information (e.g., UL TEID, (R)AN Address (such as (R)AN IP Address)), packet delay budget for aggregated PDU, PDU size limit of aggregated PDU, PDU size limit of individual PDUs to be aggregated. The individual UE information contains UE IDs, PDU Session ID, QoS Flow Identifier (QFI) of PDU Session identified by PDU Session ID. The message 1202a includes aggregation criteria for selecting PDUs for aggregation within the aggregated PDU.

This step could be performed by using N4 Session Establishment procedure described in TS 23.502, clause 4.4.1.2. There may be some modifications for this procedure. The SMF may store the mapping between the N4 Session ID as part of the aggregated tunnel context. The SMF may store the Aggregated Tunnel information as part of PDU Session Context of the UE Context. It should be appreciated that if a UE had multiple PDU sessions, then a UE can have multiple PDU Session Contexts, each for one PDU Session. The PDU Session Context contains tunnel information for both the UL and DL. If an aggregation tunnel is used for one or more PDU sessions for a UE, the aggregation tunnel info can be part of PDU Session Context of the UE Context.

Step 2b: The UPF sends N4 Aggregated Tunnel Establishment Response 1202b to the SMF to confirm the establishment of aggregated tunnel in the UPF.

The UPF may store the UL and DL aggregated tunnel information in the PDU Session Context of UE Context in the UPF. The UPF may store the packet aggregation criteria and DL aggregated tunnel information ((R)AN Address and DL TEID) in the PAF configuration information, and UL aggregated tunnel information ((R)AN Address and UL TEID) in the PDF configuration information.

Step 3: The SMF sends Aggregated Tunnel Establishment Request 1203 to the (R)AN by using Namf_Communication_N1N2MessageTransfer service of the AMF. The message may include one or more of following information: UE information of UEs in the UE Group, CN Tunnel Information (UPF Address (such as UPF IP Address) and UL TEID), packet delay budget for aggregated PDU. The individual UE information contain UE IDs, PDU Session ID, QoS Flow Identifier (QFI) of PDU Session identified by PDU Session ID, PDU size limit of aggregated PDU, PDU size limit of individual PDUs to be aggregated. Message 1203 includes the aggregation criteria for the AMF 90 to forward to the (R)AN 84 for use by the (R)AN 84 in selecting PDUs for aggregation within the aggregated PDU established between the (R)AN 84 and the UPF 86. In some embodiments, the criteria includes a user equipment (UE) context of a UE group. Once received, the AMF 90 sends Aggregated Tunnel Establishment Request acknowledgement to the SMF 92.

Step 4a: The AMF 90 forwards the N2 SM Information 1205 to the (R)AN.

The (R)AN may store the Aggregated Tunnel information in the DL and UL associated with the QoS Flow as part of PDU Session Context of UE Context. The (R)AN may store the packet aggregation criteria and UL aggregated tunnel information (UPF Address and UL TEID) in the PAF configuration information, and DL aggregated tunnel information (UPF Address and DL TEID) in the PDF configuration information.

Step 4b: The (R)AN 84 sends N2 Message Response (N2 SM Aggregated Tunnel Establishment Response) 1207 to the AMF 90. The N2 SM Aggregated Tunnel Establishment Response may include the (R)AN N3 Tunnel Information (e.g. (R)AN Address (such as IP Address), and DL TEID).

Step 5: The AMF 90 forwards the N2 SM Aggregated Tunnel Establishment Response 1209 to the SMF 92.

Step 6a: The SMF 92 sends N4 Aggregated Tunnel Modification Request 1211 to the UPF 86. The message may include the (R)AN Aggregated Tunnel Information received from (R)AN 84 in step 5.

This step could be performed by using N4 Session Modification procedure described in TS 23.502, clause 4.4.1.3.

Step 6b: The UPF 86 sends N4 Aggregated Tunnel Modification Response 1213 to the SMF 92. The UPF 86 may store the information received from the SMF 92 in corresponding PDU Session Context of UE Context, and/or in the PAF, PDF configuration information.

Aggregated Tunnel Modification

Figure 13:
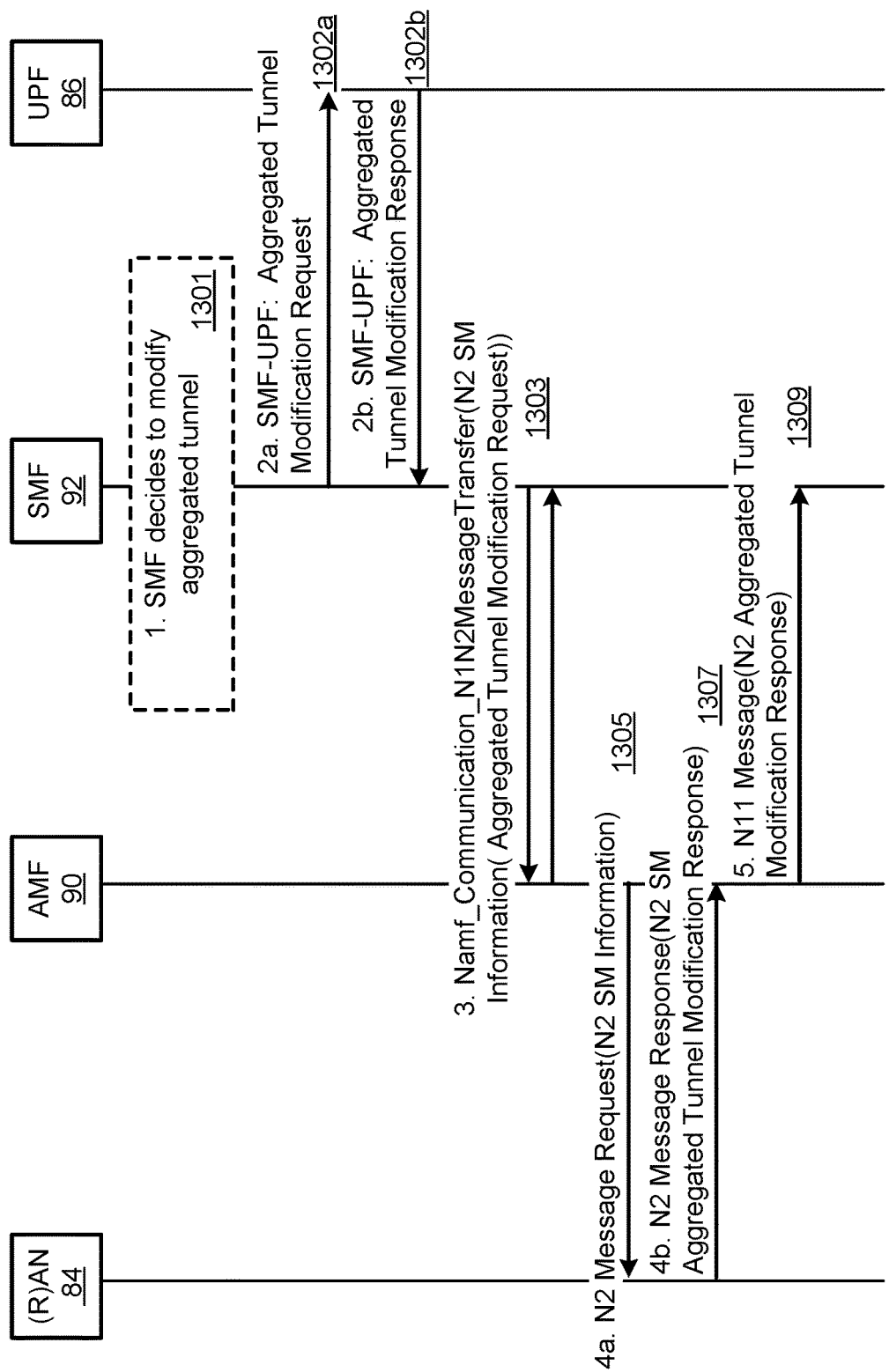
FIG. 13 is a message flow diagram illustrating an example aggregated tunnel modification process.

FIG. 13 illustrates a procedure that can be used to add or remove a QoS Flow(s) from using an existing aggregated tunnel, or to modify the parameters of aggregated tunnel such as PDB, maximum size of aggregated PDU, according to an embodiment. Referring to FIG. 13, steps in the procedure include:

Step 1 as illustrated at 1301: The SMF decides to modify aggregated tunnels between a (R)AN and UPF. The example triggers discussed above with reference to FIG. 5 can also apply to this step. Further some of the example triggers discussed below with reference to step 2601 of FIG. 26 can trigger step 1301 as well.

Step 2a: The SMF sends N4 Aggregated Tunnel Modification Request 1302a to the UPF. The message may include UE Information, an indication to add or remove the association of the UE in the UE Information, maximum size of aggregated PDU, packet delay budget for aggregated PDU. The individual UE information contain UE IDs, PDU Session ID, QoF Flow Identifier (QFI) that uses the Aggregated Tunnel to carry the PDU. The UPF may store the some information received from the SMF as part of the PAF and PDF configuration information, and/or in the PDU Session Context of UE Context in the UPF.

This step could be performed by using N4 Session Modification procedure described in TS 23.502, clause 4.4.1.3. There may be some modifications for this procedure to carry information related to the aggregated tunnel.

Step 2b: The UPF sends N4 Aggregated Tunnel Modification Response 1302b to the SMF.

Step 3: The SMF sends Aggregated Tunnel Modification Request 1303 to the (R)AN by using Namf_Communication_N1N2MessageTransfer service of the AMF. The message includes UE information, an indication to add or remove the association of the UE in the UE Information, maximum size of aggregated PDU, packet delay budget for aggregated PDU. The individual UE information contain UE IDs, PDU Session ID, QoF Flow Identifier (QFI) of PDU Session identified by PDU Session ID that uses the Aggregated Tunnel to carry the PDU.

Step 4a: The AMF forwards the N2 SM Information 1305 to the (R)AN.

Step 4b: The (R)AN sends N2 Message Response (N2 SM Aggregated Tunnel Modification Response) 1307 to the AMF. The (R)AN may store the some information received from the SMF as part of the PAF and PDF configuration information, and/or in the PDU Session Context of UE Context in the (R)AN.

Step 5: The AMF forwards the N2 SM Aggregated Tunnel Modification Response 1309 to the SMF.

Aggregated Tunnel Release

Figure 14:
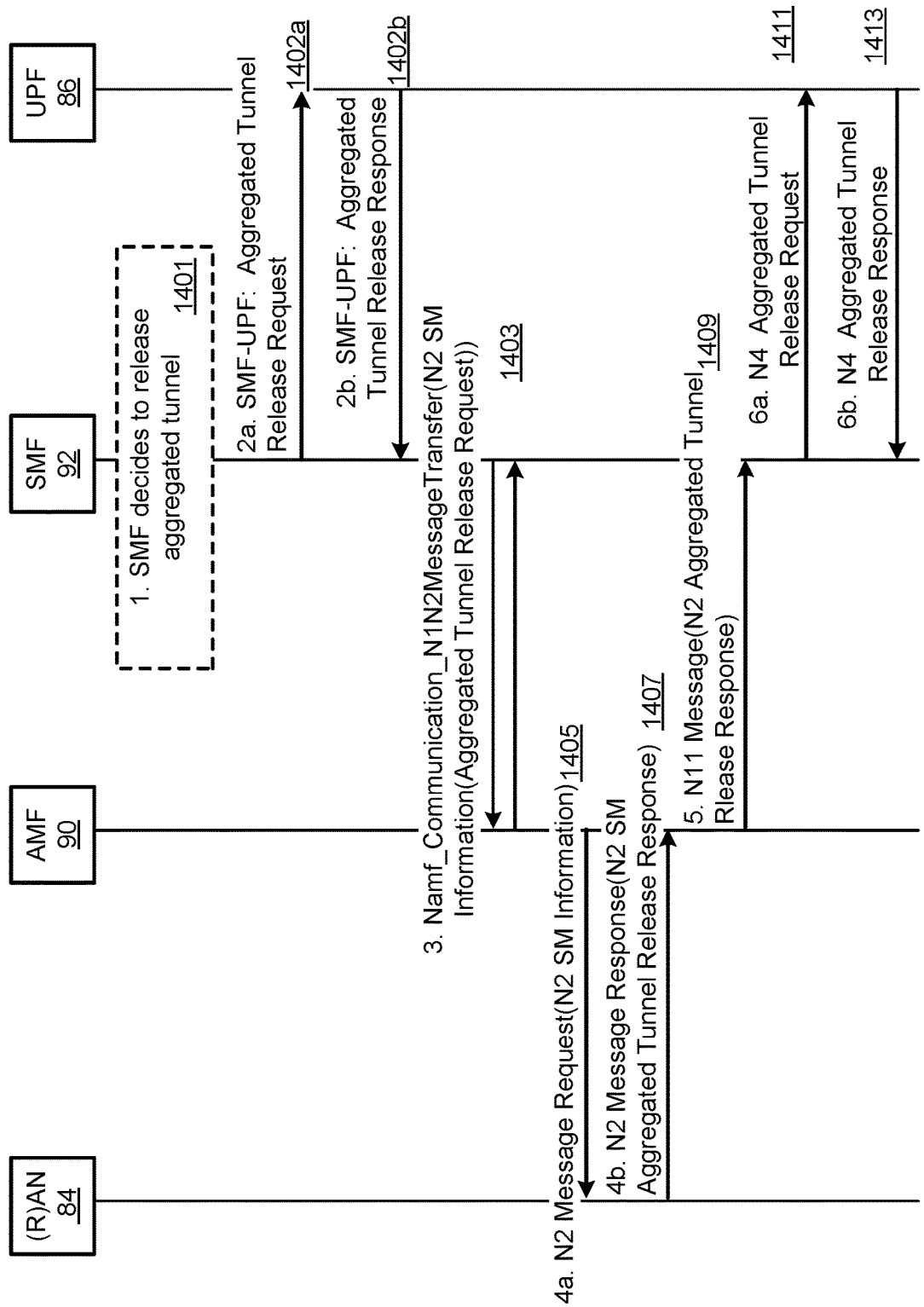
FIG. 14 is a message flow diagram illustrating an example aggregated tunnel release process.

FIG. 14 illustrates a procedure that can be used to release an existing aggregated tunnel, according to an embodiment. Referring to FIG. 14, the steps in the procedure include:

Step 1 as illustrated at 1401: The SMF decides to release aggregated tunnels. Examples of the triggers to release could be one of following:

The UDM informs the SMF that the UE Group no longer exists;

The AF informs the SMF that the UE Group no longer exists;

The AF may send an AF-influence traffic routing to the CN, in which the AF requests the traffic from UEs of a UE Group is to be sent to a different Application Server, or different DNAI.

The AMF notifies the SMF that no UE is served by the current (R)AN node because of some reasons, such as mobility or load balancing among (R)AN nodes.

The OAM, or NRF, or UPF notifies that the UPF is out of service due to some reasons, such as maintenance, failure, load balancing.

The SMF may decide to release the aggregated tunnel because, for example the traffic from the UE group is insignificant.

The SMF may decide to select another UPF to serve the UE Group. The SMF shall decide to release the aggregated tunnel in the current UPF and establish a new aggregated tunnel in the new UPF.

Step 2a: If the DL aggregated tunnel is to be removed, the SMF sends N4 DL Aggregated Tunnel Release Request 1402a to the UPF. The message includes (R)AN aggregated tunnel information ((R)AN Address and DL TEID).

This step could be performed by using the N4 Session Release procedure described in TS 23.502, clause 4.4.1.4. There may be some modifications for this procedure.

The UPF deletes the Aggregated Tunnel information that is part of PAF and PDF configuration information, and/or the Aggregated Tunnel information that is part of the PDU Session Context and associates with the QoS Flow(s). After that, the PDUs of related QoS are carried on the dedicated tunnel of the PDU Session.

Step 2b: The UPF sends N4 DL Aggregated Tunnel Release Response 1402b to the SMF confirming the removal of DL aggregated tunnel.

Step 3: The SMF sends N2 Aggregated Tunnel Release Request 1403 to the (R)AN by using Namf_Communication_N1N2MessageTransfer service of the AMF. The message include the UPF Information (UPF Address and UL TEID) if the UL aggregated tunnel is released, the (R)AN information ((R)AN Address and DL TEID) if the DL aggregated tunnel is released.

Step 4a: The AMF forwards the N2 Aggregated Tunnel Release Request 1405 to the (R)AN.

The (R)AN deletes the Aggregated Tunnel information that is part of the PDU Session Context and associates with the QoS Flow(s) and the (R)AN deletes the Aggregated Tunnel information that is part of PAF and PDF configuration parameters. After that, the PDUs of related QoS are carried on the per PDU Session tunnel of the PDU Session.

Step 4b: The (R)AN sends N2 Aggregated Tunnel Release Response 1407 to the SMF via AMF.

Step 5: The AMF forwards the N2 Aggregated Tunnel Release Response 1409 to the SMF.

Step 6a: If the UL aggregated tunnel is to be released, the SMF sends the N4 UL Aggregated Tunnel Release Request 1411 to the UPF. The message includes the (R)AN tunnel information ((R)AN Address and UL TEID).

The UPF deletes the UL Aggregated Tunnel information that is part of the PDU Session Context and associates with the QoS Flow(s) and that is PDF configuration parameters.

Step 6b: The UPF sends the N4 UL Aggregated Tunnel Release Response 1413 to the SMF.

Note that in some scenarios, steps 2a and 6b can be combined, and consequently steps 2b and 6b can be combined. For example, when the UE Group no longer exists, or all UEs of the UE Group is no longer served by a (R)AN node.

Impacts on Existing Entities and Interfaces
  Impacts to RAN:
    The RAN is capable of support Packet Aggregation and De-Aggregation.
    The RAN stores UE Group Context, consisting a list of UE IDs, Aggregated Tunnel information for UL and DL.
    The RAN stores the information Aggregated Tunnel that use to carry data of specific QoS Flow as part of PDU Session Context of UE Context.
  Impacts to UPF:
    The UPF is capable of support Packet Aggregation and De-Aggregation.
    The UPF stores UE Group Context, consisting a list of UE IDs, Aggregated Tunnel information for UL and DL.
    The UPF stores the information Aggregated Tunnel that use to carry data of specific QoS Flow as part of PDU Session Context of UE Context.
  Impacts to AMF:
    The same AMF can be configured or selected to serve IoT devices belonged to the same UE Group.
  Impacts to SMF:
    The same SMF can be configured or selected by the AMF to serve IoT devices belonged to the same UE Group.
  Impacts to UDM:
    The UDM can be configured by OAM or AF the list of UE IDs of IoT devices belonged to a UE Group.

NAS Message Aggregation between (R)AN and AMF

Figure 15:
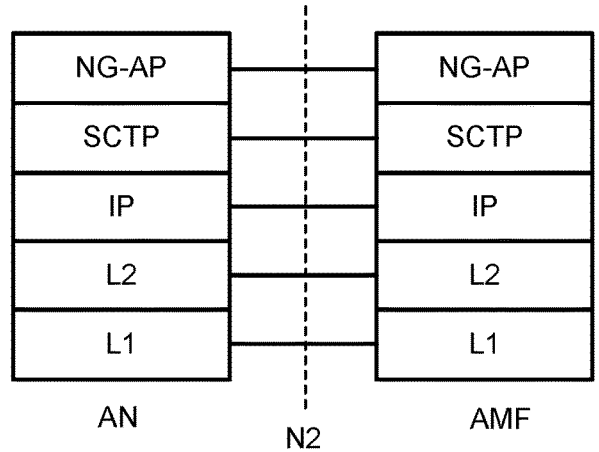
FIG. 15 illustrates an example protocol stack for N2 interface known from 3GPP TS 23.501, clause 8.2.1.2.

FIG. 15 illustrates an example protocol stack for N2 interface connections between an AN and an AMF. The NG Application Protocol (NG-AP) is an application layer protocol between the 5G-AN node and the AMF. NG-AP is defined in 3GPP TS 38.413. The Stream Control Transmission Protocol (SCTP) may ensure delivery of signalling messages between the AMF and the 5G-AN node (N2). SCTP is defined in IETF RFC 4960.

A message is created in the AN by the NG-AP layer or an NAS message is received from the UE. The message in the NG-AP layer is the payload of the SCTP layer. The SCTP layer adds SCTP protocol header to the NG-AP payload and sends to the lower layers, IP, L2, and L1. Each lower layer encapsulates the higher-layer payload in its packet format.

As mentioned above, packet aggregation can be used in the user plane as described above, but also for aggregating messages to be sent via the control plane. Accordingly, it should be appreciated that the term UL PDU can refer both to UL user plane PDUs and also to UL CP messages.

Figure 16:
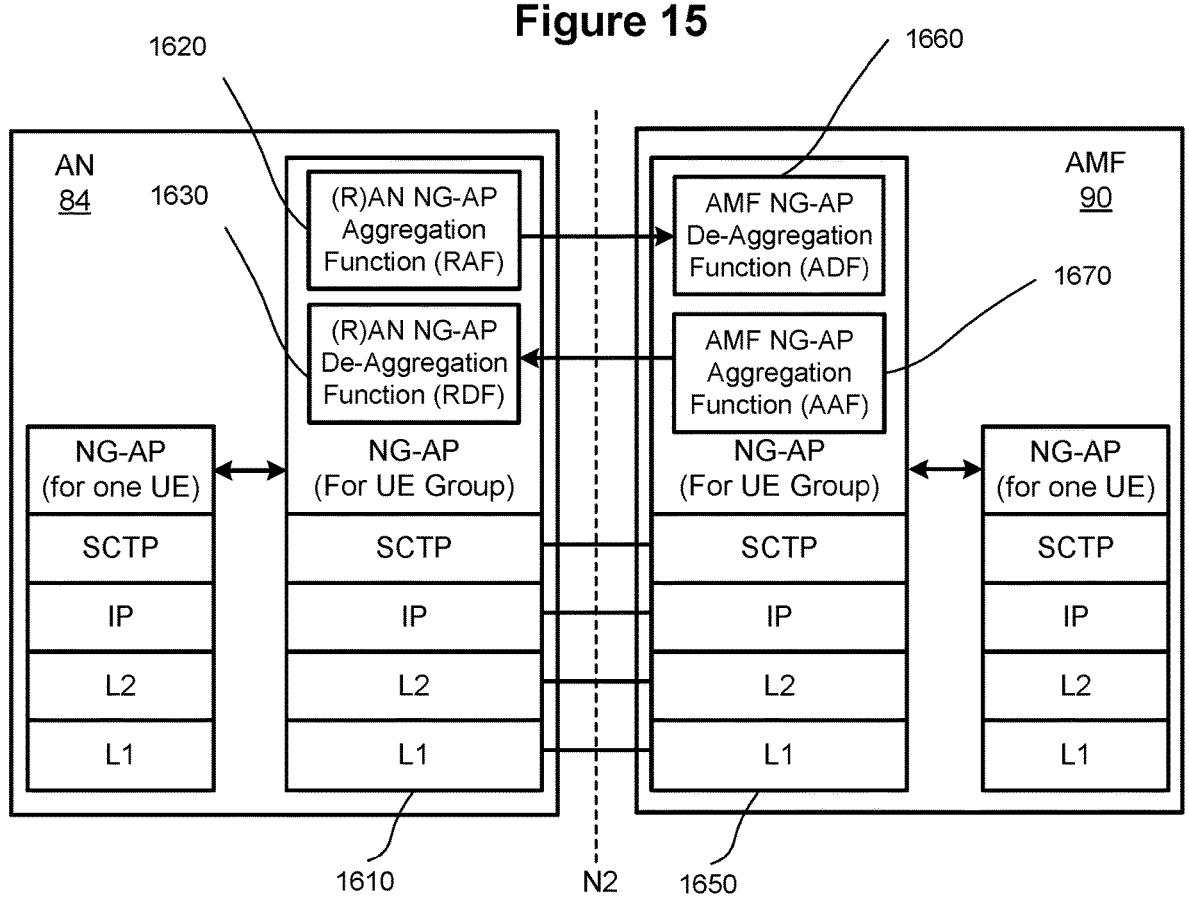
FIG. 16 illustrates an example protocol stack for N2 interface with NAS message aggregation functionality.

When small PDUs are sent in an NAS message to the (R)AN node, the (R)AN may aggregate multiple small NAS PDUs into a larger-sized aggregated NAS message and send it to the AMF. FIG. 16 illustrates an example of the functional protocol stack of N2 interface with NAS message aggregation. In FIG. 16 access node (AN) 84 includes a (R)AN NG-AP aggregation function (RAF) 1620 and corresponding (R)AN NG-AP de-aggregation function (RDF) 1630 for aggregating and de-aggregating packets using a modified NG-AP protocol stack interface 1610. Aggregated packets can be transmitted between the AN 84 and AMF 90 using the N2 interface. AMF 90 includes AMF NG-AP aggregation function (AAF) 1670 and corresponding AMF NG-AP de-aggregation function (ADF) 1660 for aggregating and de-aggregating packets using an NG-AP protocol stack interface 1650.

Figure 17:
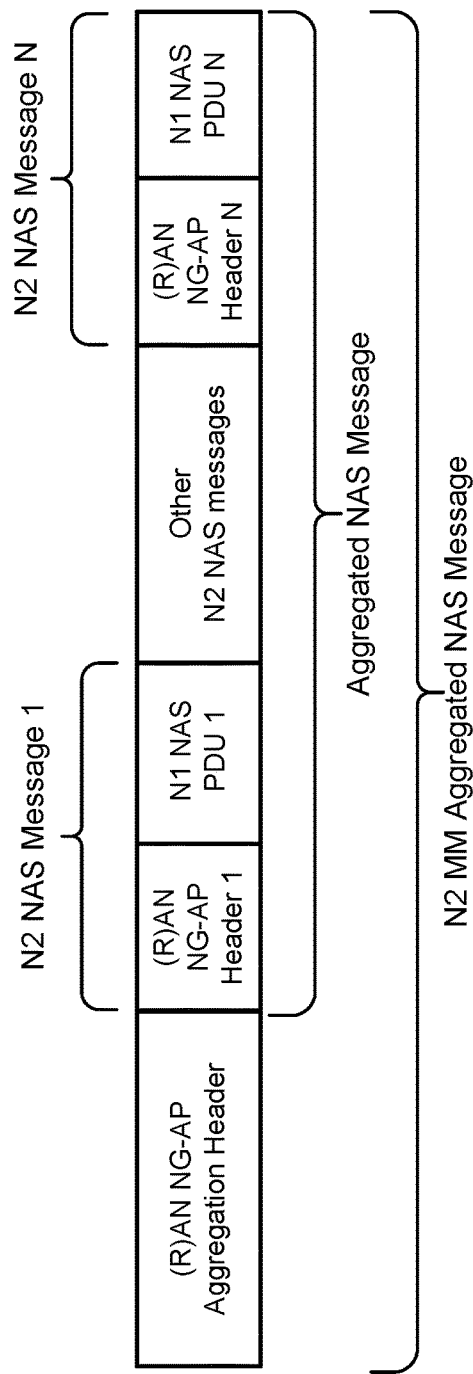
FIG. 17 shows an example format of an N2 MM Aggregated NAS message.

FIG. 17 shows an example format of an N2 MM Aggregated NAS message created by the (R)AN. In the (R)AN, the (R)AN NG-AP layer of one UE receives a NAS PDU message from a UE. Assuming this message satisfies the aggregation criteria received from the SMF, the NG-AP layer of the (R)AN adds (R)AN NG-AP Header to the N1 NAS PDU to create an N2 NAS message and sends it to the (R)AN NG-AP Aggregation Function (RAF). The RAF aggregates multiple N2 NAS messages from one or several UEs into an Aggregated NAS message, and adds a corresponding (R)AN NG-AP Aggregation Header to the Aggregated NAS message to make an N2 MM Aggregated NAS message. The (R)AN sends the N2 MM Aggregated NAS message to the AMF using the N2 interface. This scenario can be useful, for example, for a utility company which has a large number of meters sending small meter reading packets of tens or hundreds of bytes to a single server. Such small packets, all destined to a common destination (e.g., an application function associated with the utility company), can be sent using the aggregated NAS message to reduce processing load and signaling overhead in CP functions.

The (R)AN N2 NAS message may include one or more of the following information:
  The Message Type: Uplink NAS Transport for PDU, which indicates that the NAS message carries a PDU. The format of this information element may be defined in a similar way as described in 3GPP TS 38.413, clause 9.3.1.1.
  AMF UE Group NGAP Identifier: uniquely identifies the UE Group association over the NG interface within the AMF as defined in TS 38.413, clause 9.2.5.3.
  RAN UE Group NGAP Identifier: uniquely identifies the UE Group association over the NG interface within the NG-RAN node as defined in TS 38.413, clause 9.2.5.3.
  NAS-PDU: This information element contains a 5GC—UE or UE—5GC message that is transferred without interpretation in the NG-RAN node as defined in TS 38.413, clause 9.2.5.3. With respect to FIG. 3, the NAS-PDU carries N1 NAS PDU message.
  User Location Information: This is used to provide location information of the UE as defined in TS 38.413, clause 9.2.5.3.

The (R)AN N2 MM Aggregated NAS Message may include one or more of the following information:
  A Message Type: Uplink NAS Transport, carrying aggregated NAS messages. The format of this information element may be defined in a similar way as described in 3GPP TS 38.413, clause 9.3.1.1.
  An AMF UE Group NGAP Identifier uniquely identifying the UE Group association over the NG interface within the AMF. The format of this information element may be defined in a similar way as described in 3GPP TS 38.413, clause 9.3.3.1.

A RAN UE Group NGAP Identifier uniquely identifying the UE Group association over the NG interface within the NG-RAN node. The format of this information element may be defined in a similar way as described in 3GPP TS 38.413, clause 9.3.3.2.

A NAS-PDU: this information element may contain contains a 5GC—UE or UE—5GC message that is transferred without interpretation in the NG-RAN node as defined in TS 38.413, clause 9.3.3.4. With respect to FIG. 17, the NAS-PDU carries an aggregated NAS message.

A length of Aggregated NAS Message.

A number of N2 NAS messages in the Aggregated NAS message.

A length of each N2 NAS message in the Aggregated NAS message.

The AMF receives the N2 MM Aggregated NAS message. The AMF NG-AP De-Aggregation Function (ADF) reads the (R)AN NG-AP Aggregation Header and de-aggregates N2 NAS messages. By reading the (R)AN NG-AP Header, the AMF may update the UE location. The AMF may forward the N1 NAS PDU message to the SMF or to the UPF, or the NEF. It should be appreciated that NAS PDUs can be sent from the UE to the RAN via UL RRC messages. The UL RRC may carry both NAS PDU and NAS signaling. In some embodiments, only the NAS PDUs are aggregated. In other embodiments, the NAS signaling can also be aggregated.

Figure 18:
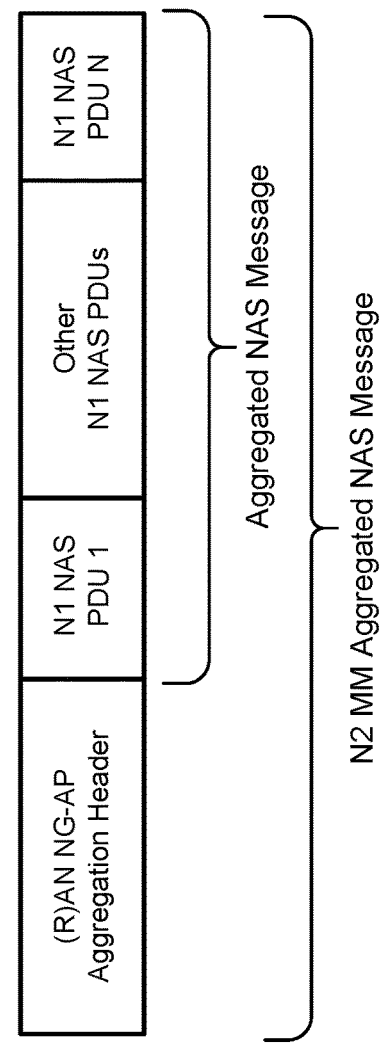
FIG. 18 shows another example format of an N2 MM Aggregated NAS message.

Another format of N2 MM Aggregated NAS message created by the (R)AN is shown in FIG. 18. The NG-AP layer associated with the UE does not add the (R)AN NG-AP Header; the NG-AP layer associated with the UE forwards the N1 NAS PDU to the AMF. The (R)AN NG-AP Aggregation Header of Option 2 is the same as the format shown in FIG. 17.

Figure 19:
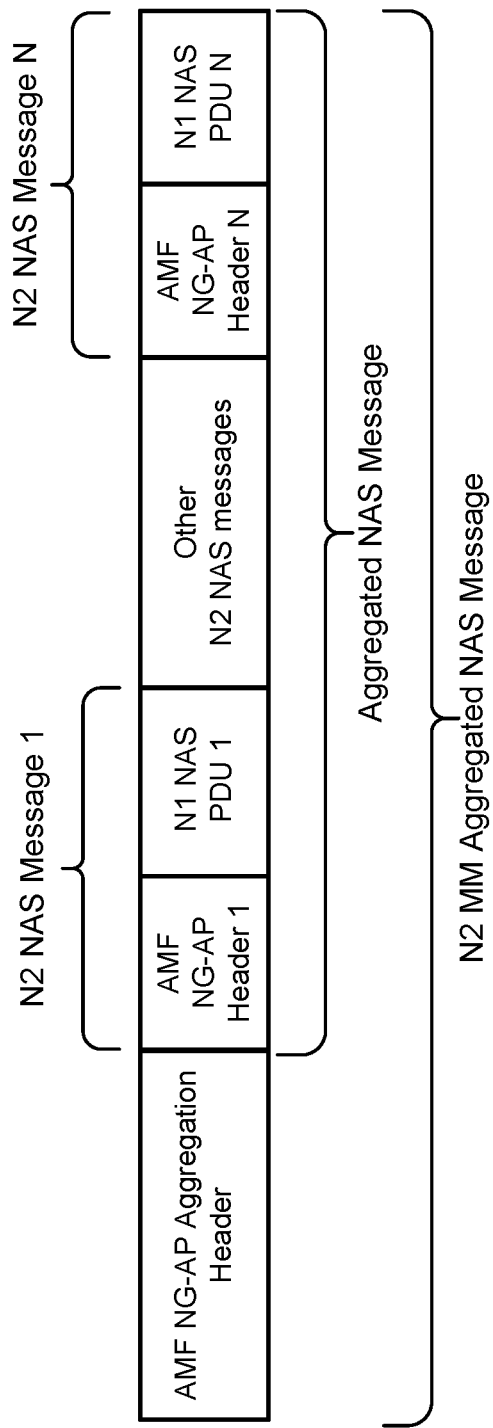
FIG. 19 shows another example format of a N2 MM Aggregated NAS message.

FIG. 19 shows an example format of an N2 MM Aggregated NAS message created by the AMF to be sent from the AMF to the (R)AN. In the AMF, the NG-AP layer associated with the UE may add the AMF NG-AP Header to the N1 NAS PDU message and creates the N2 NAS message. Then the NG-AP layer associated with the UE sends the N2 NAS message to the AMF NG-AP Aggregation Function (AGF). The AGF may aggregate several N2 NAS messages for the same or multiple UEs into one Aggregated NAS message. The AFG adds a header, called AMF NG-AP Aggregation Header, to the Aggregated NAS Message to create an N2 MM Aggregated NAS message. Then the AMF sends the N2 MM Aggregated NAS Message to the (R)AN. The (R)AN NG-AP De-Aggregation Function (RDF) performs de-aggregation of the N2 MM Aggregated NAS message. The (R)AN forward the N1 NAS PDU message to the corresponding UE.

The AMF N2 NAS message may include one or more of the following information:

Message type: Downlink NAS Transport, carrying PDU data. The format of this information element is defined in as similar way as described in 3GPP TS 38.413, clause 9.3.1.1.

AMF UE NGAP ID: The AMF UE NGAP ID uniquely identifies the UE association over the NG interface within the AMF. The format of this information element is defined in 3GPP TS 38.413, clause 9.3.3.1.

RAN UE NGAP ID: The RAN UE NGAP ID uniquely identifies the UE association over the NG interface within the NG-RAN node. The format of this information element may be defined in 3GPP TS 38.413, clause 9.3.3.2.

Priority Level, which may contain the service priority as defined in TS 23.501. The format of this information element is defined in 3GPP TS 38.413, clause 9.3.3.15.

NAS-PDU: In general, this information element may contain a 5GC—UE or UE—5GC message that is transferred without interpretation in the NG-RAN node. The format of this information element is defined in 3GPP TS 38.413, clause 9.3.3.4. With respect to FIG. 19, the NAS-PDU carries the N1 NAS PDU data message.

Handover Restriction List: The format of this information element may be defined in 3GPP TS 38.413, clause 9.2.5.2.

Subscriber Profile ID for RAT/Frequency Priority: The format of this information element may be defined in 3GPP TS 38.413, clause 9.2.5.2.

In FIG. 19, the AMF N2 MM Aggregated NAS message may include one or more of the following information:

Message type: Downlink NAS Transport, carrying Aggregated NAS PDU data message. The format of this information element may be defined in as similar way as described in 3GPP TS 38.413, clause 9.3.1.1.

AMF UE NGAP ID: The AMF UE NGAP ID uniquely identifies the UE association over the NG interface within the AMF. The format of this information element may be defined in 3GPP TS 38.413, clause 9.3.3.1.

RAN UE NGAP ID: The RAN UE NGAP ID uniquely identifies the UE association over the NG interface within the NG-RAN node. The format of this information element may be defined in 3GPP TS 38.413, clause 9.3.3.2.

Priority Level: This IE contains the service priority as defined in TS 23.501. The format of this information element is defined in 3GPP TS 38.413, clause 9.3.3.15.

NAS-PDU: In general, this information element contains a 5GC—UE or UE—5GC message that is transferred without interpretation in the NG-RAN node. The format of this information element may be defined in 3GPP TS 38.413, clause 9.3.3.4. With respect to FIG. 19, the NAS-PDU my carry the Aggregated NAS message.

NAS Message Aggregation in CP Functions

Figure 20:
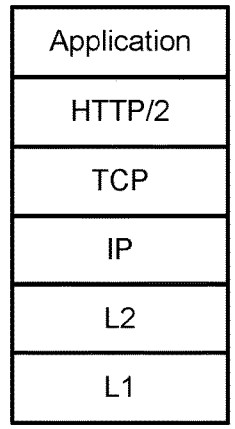
FIG. 20 shows an example Service Based Interface (SBI) protocol stack for communication between two control plane functions.

The CP network functions, such as AMF and SMF, use the Service-Based Interface (SBI) protocol stack to communicate with each other. FIG. 20 shows the SBI protocol stack specified in 3GPP TS 29.500, clause 5.1. For example, when the SMF wants to request a service of the AMF, the SMF Application uses a HTTP/2 message format. The TCP layer establish a TCP session to transfer the HTTP/2 message to the AMF. The TCP layer and other lower layers add protocol header to the HTTP/2 message.

Figure 21:
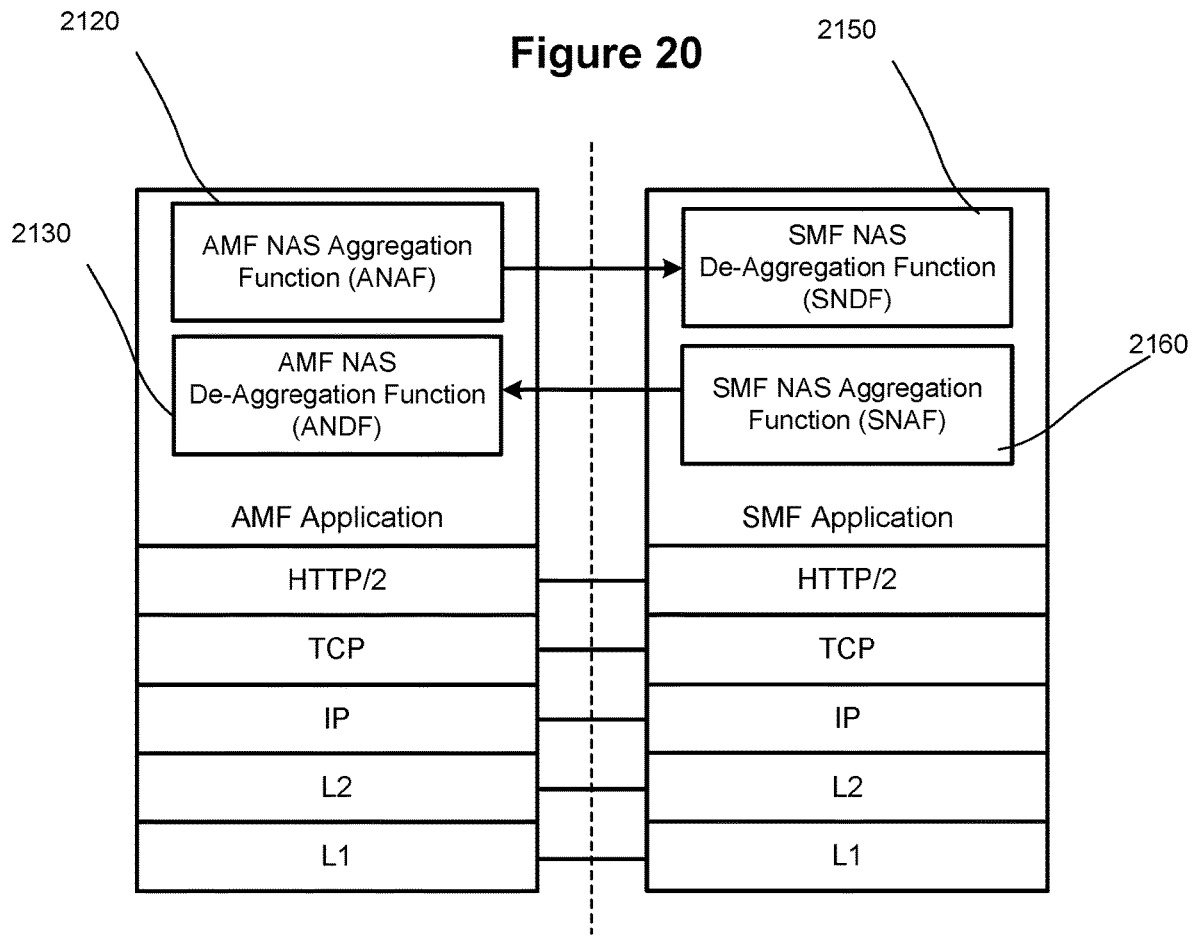
FIG. 21 shows an example SBI protocol stack for communication between control plane functions with message aggregation functionality.

FIG. 21 illustrates a method to aggregate small-sized messages into a larger message to send between two CP functions, such as AMF and SMF. The AMF Application layer has two functions to perform NAS Aggregation Function (ANAF) 2120 and NAS De-Aggregation Function (ANDF) 2130. The SMF also has SMF NAS Aggregation Function (SNAF) 2160 and SMF NAS De-Aggregation Function (SNDF) 2150.

If the AMF receives multiple N1 NAS PDU messages carrying PDUs from several UEs, the ANAF 2120 uses multipart features of HTTP/2 protocol to send each N1 NAS PDU message into one binary body part of the HTTP multipart message. The AMF sends the HTTP multipart message to the SMF, the SNDF function 2150 in the SMF Application layer then separates the N1 NAS PDU messages, extracts the PDU from the N1 NAS message and sends the PDU to the UPF or NEF.

Similarly, if the SMF receives multiple PDUs from UPF or NEF, the SMF Application creates the N1 NAS PDU to be sent to the UE. The SNAF 2160 sends each N1 NAS PDU message into one binary part of the HTTP multipart message. The SMF then sends the HTTP multipart message to the AMF. The ANDF 2130 in the AMF separates the N1 NAS PDU message and sends to the UE via (R)AN.

If the PDU is to be sent between the SMF and NEF, the PDU can be aggregated/de-aggregated in the NEF as described in for the AMF and SMF. The NEF Application layer also has NEF PDU Aggregation Function and NEF PDU De-Aggregation Function (not shown).

4. Packet Aggregation for Data Delivery between SMF and UPF

The SMF and UPF can create a tunnel, such as GTP-U tunnel as described for the N3 or N9 Aggregated Tunnel. The aggregated PDU formats for N3 tunnel have been presented earlier.

5. Application of Packet Aggregation for Small Packet Delivery in Control Plane

Figure 22:
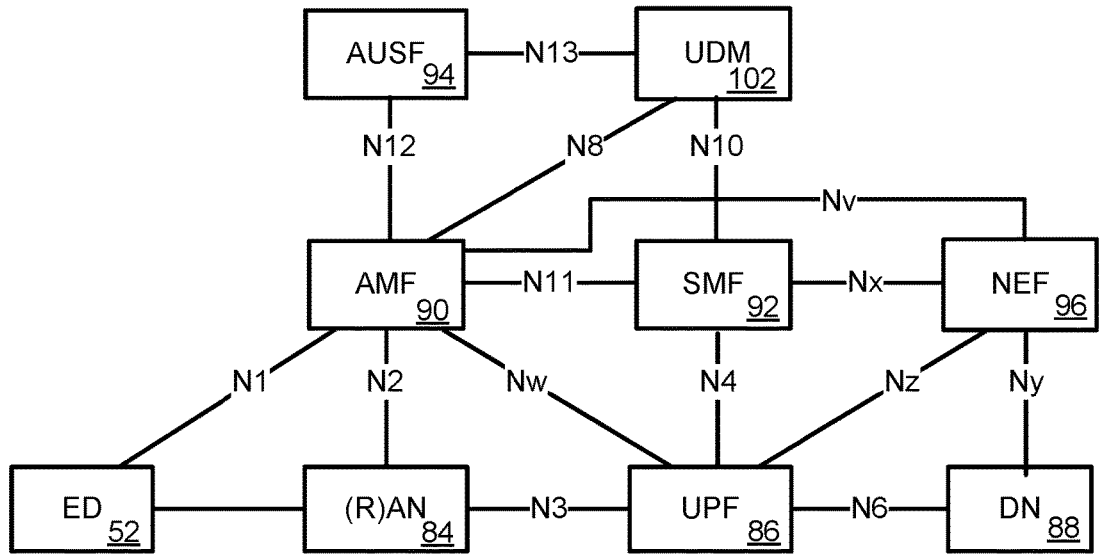
FIG. 22 is a block diagram illustrating an example system architecture for small data delivery via NAS or UP and N6.
Figure 23:
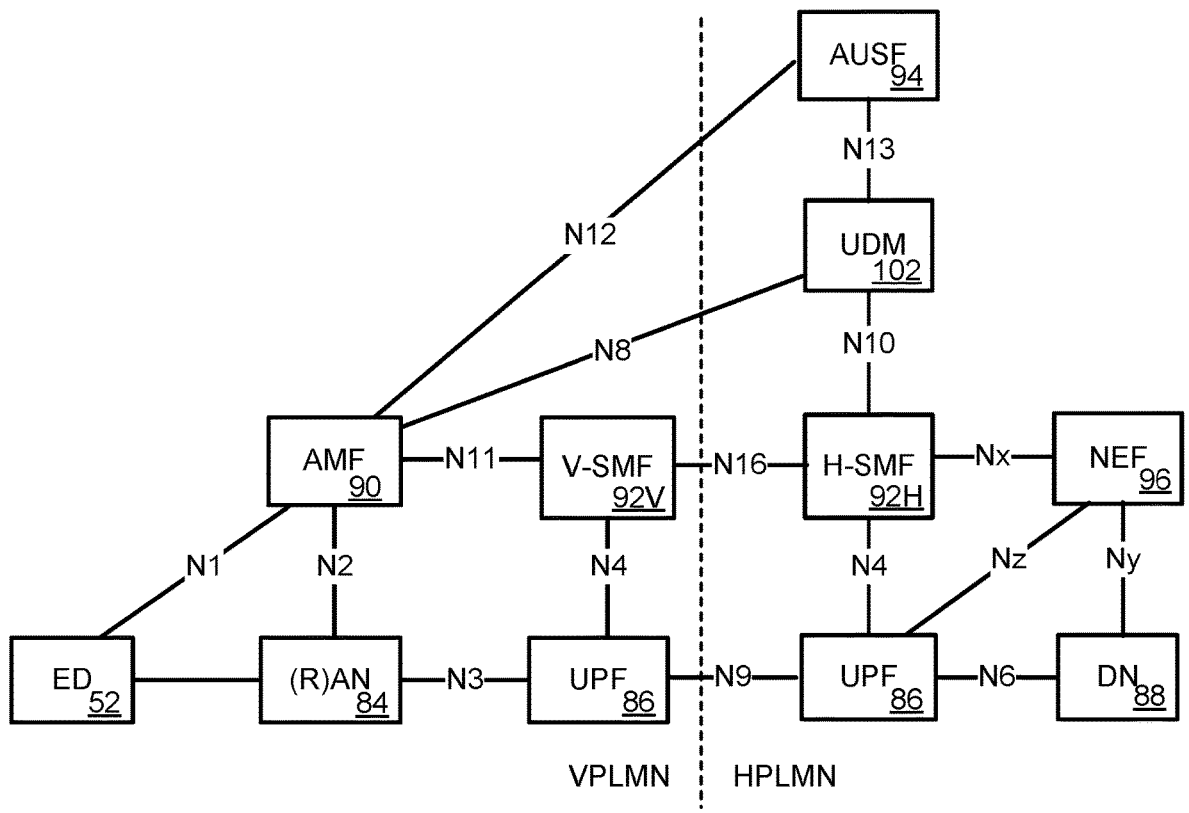
FIG. 23 is a block diagram illustrating another example system architecture for small data delivery via NAS or UP and N6.
Figure 24:
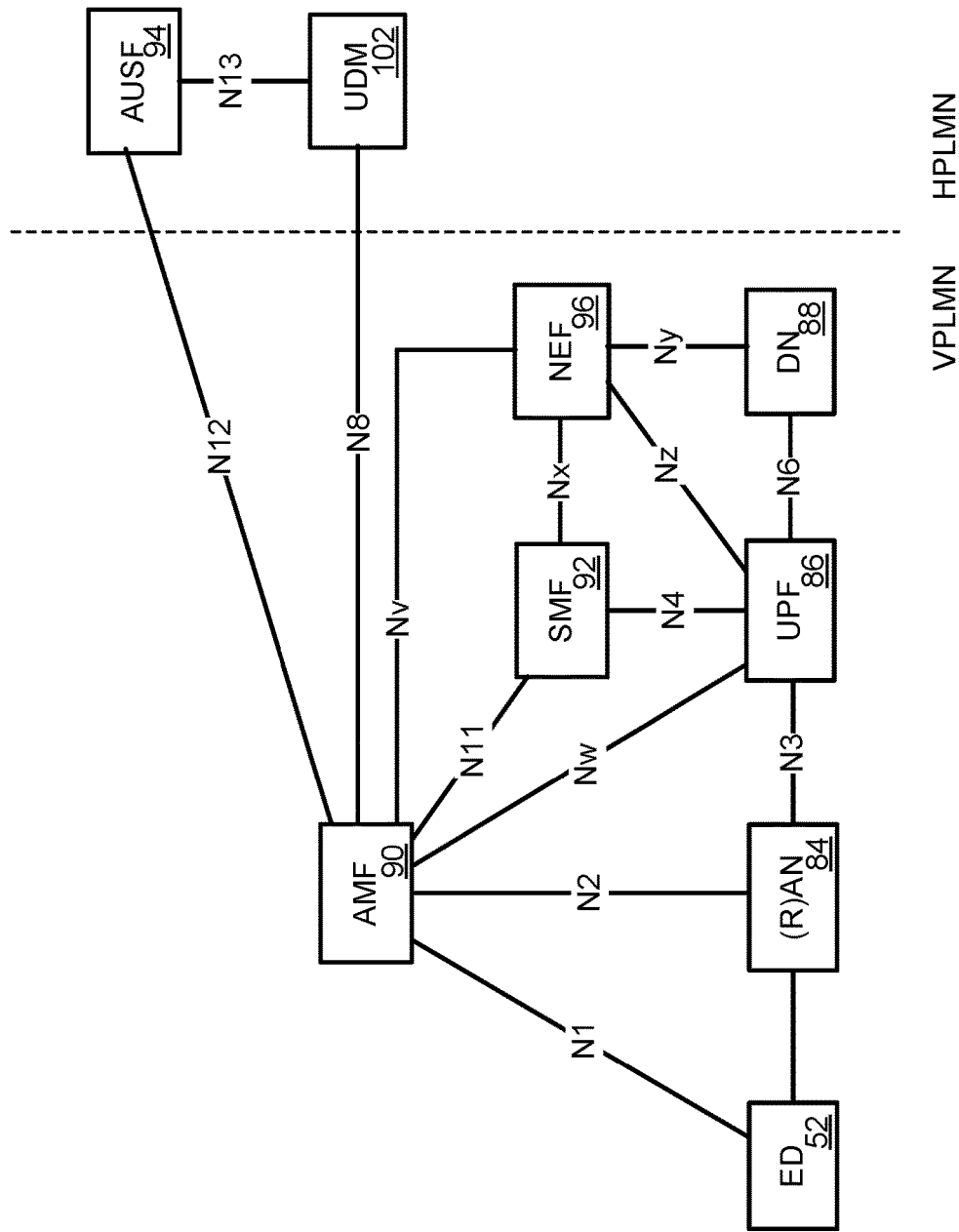
FIG. 24 is a block diagram illustrating a further example system architecture for small data delivery via NAS or UP and N6.

The small data transmission using NAS message can be implemented in different ways as shown in FIGS. 22, 23 and 24.

In FIG. 22, a CP-based system architecture is illustrated, in which the AMF and SMF are used to transfer PDUs from or to the UE. The PDU(s) is carried in N1 NAS SM message, the N1 NAS SM message is sent between the UE and the (R)AN using RRC messages sent over a control radio bearer or data radio bearer, between (R)AN and AMF over an N2 interface, between AMF and SMF using an SBI interface (referenced by N11 interface) or a tunnel similar to N3 interface, between SMF and UPF over an N4 interface or a tunnel similar to N3 interface, and between UPF and DN over an N6 interface.

In FIG. 22, another CP-based system architecture is illustrated, in which the AMF, SMF and NEF are used to transfer PDUs from or to the UE. The PDU(s) is carried in an N1 NAS SM message; the N1 NAS SM message sent between the UE and the (R)AN by using a RRC control radio bearer or data radio bearer, between (R)AN and AMF over an N2 interface, between AMF and SMF using an SBI interface (referenced by N11 interface) or a tunnel similar to N3 interface, between the SMF and NEF over an SBI interface (referenced by Nx interface) or a tunnel similar to N3 interface, between the NEF and DN over an Ny interface, which could be the same as N6 interface.

Alternatively, the AMF may be used to transfer PDUs from or to the UE. In this case, the PDU(s) is carried in an N1 NAS SM message; the N1 NAS SM message sent between the UE and the (R)AN by using a RRC control radio bearer or data radio bearer, between (R)AN and AMF over an N2 interface, between the AMF and UPF by using Nw interface, and between UPF and DN over an N6 interface. The Nw interface can be implemented by an SBI interface, or N3 interface, with some possible modifications.

In a further alternative, the AMF and NEF may be used to transfer PDUs from or to the UE. The PDU(s) is carried in an N1 NAS SM message; the N1 NAS SM message sent between the UE and the (R)AN by using a RRC control radio bearer or data radio bearer, between (R)AN and AMF over an N2 interface, between the AMF and NEF by using an Nv interface, and between the NEF and DN by using an Ny interface. The Nv interface can be implemented by an SBI interface, or N3 interface, with some possible modifications. The Ny interface could be the same as N6 interface.

PDUs may also be transferred to or from the UE via the user plane. In this case, the PDUs are sent between the UE and the (R)AN by using a data radio bearer, between the (R)AN and the UPF by using N3 interface, and between UPF and DN by using N6 interface.

Alternatively, PDUs may be sent between the UE and the (R)AN by using a data radio bearer, between the (R)AN and the UPF by using N3 interface, and between the UPF and NEF by using an Nz interface, where the Nz interface could be the same as N3 interface, and between the NEF and DN by using Ny interface, which could be the same as N6 interface.

FIG. 23 illustrates an example system architecture for small data delivery via NAS and UP and N6, with home-routed roaming.

In the system architecture of FIG. 23, a CP-based solution for roaming UE in a VPLMN, where the AMF and V-SMF in the VPLMN are used to transfer PDUs from or to the UE. The PDU(s) is carried in an N1 NAS SM message; the N1 NAS SM message sent between the UE (roaming in a Visiting PLMN (VPLMN)) and the (R)AN using RRC control or data radio bearer, between (R)AN and AMF over an N2 interface, between AMF and V-SMF using an SBI interface (referenced by N11 interface) or a tunnel similar to N3 interface, between V-SMF and UPF in VPLMN over an N4 interface or a tunnel similar to N3 interface, between UPF in VPLMN and UPF in the HPLMN over an N9 interface, and between the UPF in HPLMN and the DN over an N6 interface.

An alternative CP-based solution is that the AMF, V-SMF and H-SMF are used to deliver PDUs. In this case, the PDU(s) is carried in an N1 NAS SM message; the N1 NAS SM message sent between the UE (roaming in a Visiting PLMN (VPLMN)) and the (R)AN using RRC control or data radio bearer, between (R)AN and AMF over an N2 interface, between AMF and V-SMF using an SBI interface (referenced by N11 interface) or a tunnel similar to N3 interface, between V-SMF and H-SMF over an SBI interface (referenced by N16 interface), and between the H-SMF and UPF in the HPLMN over an N4 interface or another interface similar to N3 interface.

Alternatively, the AMF, V-SMF, H-SMF and NEF may be used to deliver PDUs. In this case, the PDU(s) is carried in an N1 NAS SM message; the N1 NAS SM message is sent between the UE (roaming in a Visiting PLMN (VPLMN)) and the (R)AN using RRC control or data radio bearer, between the (R)AN and AMF over an N2 interface, between AMF and V-SMF using an SBI interface (referenced by N11 interface) or a tunnel similar to N3 interface, between V-SMF and H-SMF over an SBI interface (referenced by N16 interface), and between the H-SMF and NEF in the HPLMN using an SBI interfaced (referenced by Nx interface) or by a tunnel similar to N3 interface, between the NEF and DN by an Ny interface, which may be the same as N6 interface.

In another alternative solution, PDUs may be transferred to or from the UE by using the user plane. In this case, PDUs may be sent between the UE and the (R)AN by using a data radio bearer, between the (R)AN and the UPF by using N3 interface, between the UPF in VPLMN and the UPF in HPLMN by using N9 interface, and between the UPF in HPLMN and the DN by using N6 interface.

Alternatively, the PDU may be sent between the UE and the (R)AN by using a data radio bearer, between the (R)AN and the UPF in VPLMN by using an N3 interface, between the UPF in VPLMN and the UPF in HPLMN by using an N9 interface, between the UPF and NEF in HPLMN by using an Nz interface, where the Nz interface could be the same as N3 interface, and between the NEF in the HPLMN and DN by using Ny interface, which could be the same as N6 interface.

FIG. 24 is a block diagram illustrating a further example system architecture for small data delivery. In the system architecture of FIG. 24, a CP-based solution for roaming UE in a VPLMN uses the AMF and SMF of the VPLMN to deliver PDUs. In this case, the PDU(s) is carried in an N1 NAS SM message; the N1 NAS SM message may be sent between the UE (roaming in a VPLMN) and the (R)AN using RRC control radio bearer or data radio bearer, between (R)AN and AMF over an N2 interface, between the AMF and the SMF using an SBI interface (referenced by N11 interface) or a tunnel similar to N3 interface, between the SMF and the UPF over an N4 interface or a tunnel similar to N3 interface, between UPF and DN over an N6 interface.

Alternatively, the PDU(s) is carried in an N1 NAS SM message; the N1 NAS SM message may be sent between the UE (roaming in a VPLMN) and the (R)AN using RRC control radio bearer or data radio bearer, between (R)AN and AMF over an N2 interface, between the AMF and the SMF using an SBI interface (referenced by N11 interface) or a tunnel similar to N3 interface, between the SMF and the NEF over an Nx interface or a tunnel similar to N3 interface, between NEF and DN over an Ny interface, where the Ny interface could be similar to the N6 interface.

Alternatively, the PDU(s) is carried in an N1 NAS SM message; the N1 NAS SM message may be sent between the UE and the (R)AN by using a RRC control radio bearer or data radio bearer, between (R)AN and AMF over an N2 interface, between the AMF and UPF by using Nw interface, and between UPF and DN over an N6 interface. The Nw interface can be implemented by an SBI interface, or N3 interface, or N4 interface, with some possible modifications.

Alternatively, the PDU(s) is carried in an N1 NAS SM message; the N1 NAS SM message may be sent between the UE and the (R)AN by using a RRC control radio bearer or data radio bearer, between (R)AN and AMF over an N2 interface, between the AMF and NEF by using an Nv interface, and between the NEF and DN by using an Ny interface. The Nv interface can be implemented by an SBI interface, or N3 interface, with some possible modifications. The Ny interface could be the same as N6 interface.

Alternatively, the PDUs may be sent between the UE and the (R)AN by using a data radio bearer, between the (R)AN and the UPF by using N3 interface, and between the UPF and DN by using N6 interface.

Alternatively, the PDUs may be sent between the UE and the (R)AN by using a data radio bearer, between the (R)AN and the UPF by using N3 interface, and between the UPF and the NEF by using an Nz interface, where the Nz interface could be the same as N3 interface, and between the NEF and DN by using Ny interface, which could be the same as N6 interface.

In all of above scenarios, the N2 interface, the SBI interface, the N3/N9 interface, N6 interface can be used to deliver PDUs. A combination of packet aggregation solutions over these interfaces can be used.

Procedure to Establish CP and UP Packet Aggregation

Figure 25:
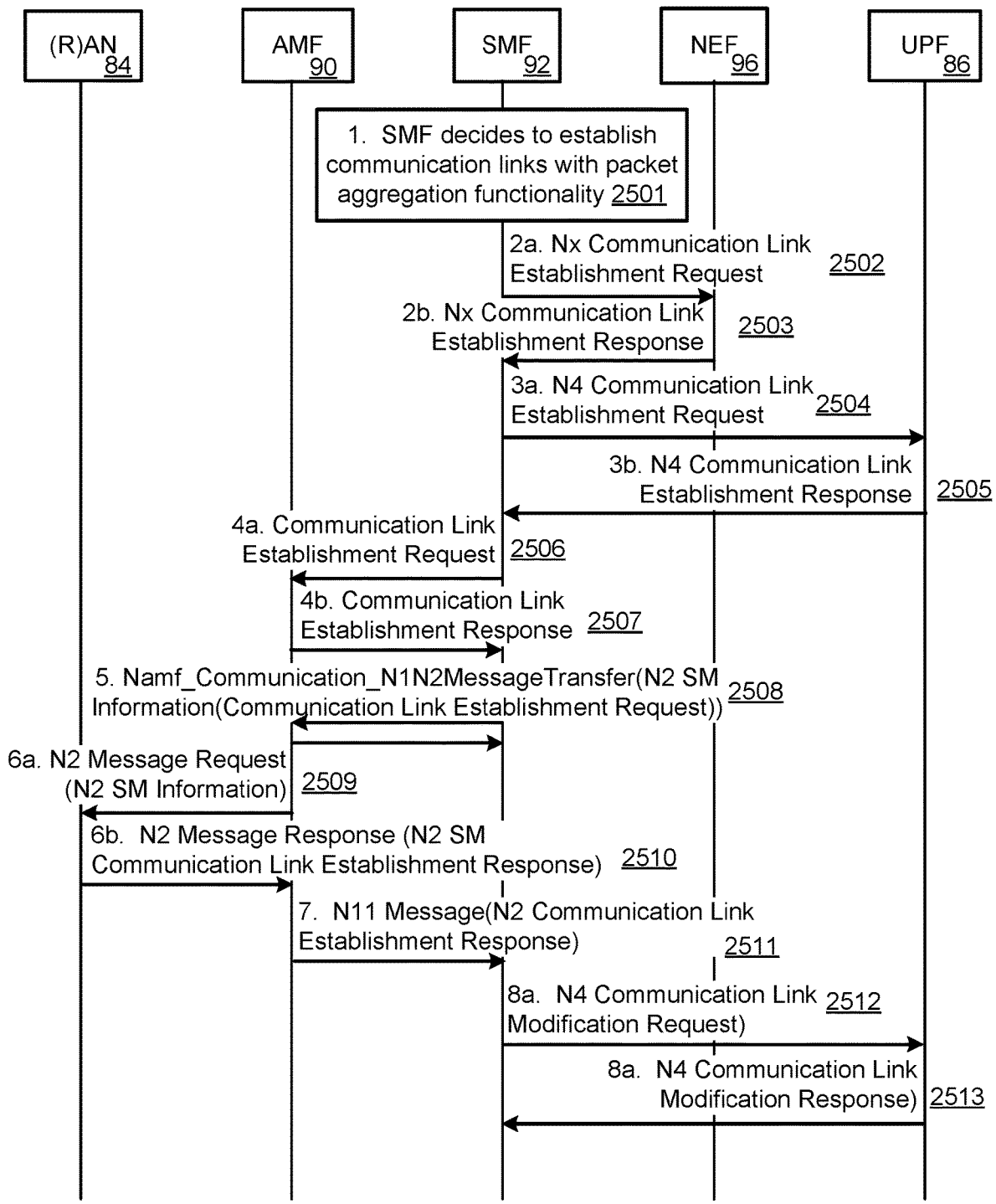
FIG. 25 is a message flow diagram showing an example method to establish a communication link between network functions with packet aggregation functionality.

FIG. 25 is a message flow diagram showing an example method to establish a communication link between network functions with packet aggregation functionality. The communication links can be any links connecting two network functions using GTP-U protocol for N3 and N9 reference points, SBI interface protocol for CP functions, NG-AP protocol for N2 reference point, and protocol for N4 reference point. In the process of FIG. 25:

Step 1 as illustrated at 2501: The SMF decides to establish communication links with packet aggregation functionality. The trigger may be any one or more of the following:
- The SMF has established one or several PDU sessions for UEs of a UE group.
- The SMF receives statistical information on traffic characteristics of a UE group from NWDAF. The statistical information may contain the following information: packet sizes (minimum and maximum values, distribution of packet size), traffic volume such as total number of packets or total number of bytes or octets, the packet rate (number of packets per second).
- The NWDAF may analyse traffic characteristics of UE group and send analytic information to the SMF, suggesting the preferred UPF(s) and/or NEF to serve as packet aggregation points.
- The SMF receives UE Group information from the UDM when the SMF establishes PDU Session for a UE,
- The UDM may send UE Group information to the SMF in PDU Session Modification procedure.
- The PCF may send a Traffic Routing policy to the SMF, where the PDUs from UEs of a UE Group are to be forwarded to one or some DNAIs, where the DNAIs are provided in a list of DNAIs.
- The AF may send the list of DNAI in an AF-influence traffic routing request to the PCF. The AF may send the list of UEs as a part of UE Group information in the AF-influence traffic routing request.

Step 2a: The SMF sends a Communication Link Establishment Request 2502 to the NEF over an Nx interface, in which the Nx could be SBI interface. There are several possible communication links from a NEF to other network functions to carry PDUs. Example options include:
- Communication Link Option 1: If the communication link is to be established between a CP function (such as SMF or AMF) and NEF for control plane data delivery over an SBI interface, the SMF may include one or more of following information: an identifier to identify Aggregation Communication Link, the CP function Address (such as IP Address or FQDN (Fully Qualified Domain Name), or URL) that receives the aggregation PDU; an indication to use packet aggregation over SBI interface such as using HTTP multipart message; packet delay budget for packet aggregation in the control plan function (which is NEF in this step); UE information including UE IDs (e.g. External UE ID, SUPI, IMSI, TMSI), UE Group information of UE (e.g. Internal Group ID, External Group ID), PDU Session ID; PDU size limit of aggregated PDU.
- Communication Link Option 2: If the communication link is to be established between a CP function (such as SMF or AMF) and NEF for control plane data delivery over a tunnel, such as GTP-U tunnel specified in 3GPP TS 29.281, the SMF may include the one or more of following information: an identifier to identify Aggregation Communication Link, Tunnel Information (such as IP Address of CP function, UL TEID of the aggregation tunnels from the CP function to the NEF and the DL TEID of the aggregation tunnel from NEF to the CP network function); UE information of UEs in the UE Group (e.g. Internal Group ID, External Group ID); packet delay budget for aggregated PDU, PDU size limit of aggregated PDU. The individual UE information contains UE IDs (e.g. External UE ID, SUPI, IMSI, TMSI), PDU Session ID, QoS Flow Identifier(s) (QFI) of PDU Session.

Communication Link Option 3: If the communication link is to be established between a UPF and NEF for UP data delivery over a tunnel, such as GTP-U tunnel specified in 3GPP TS 29.281, the SMF may include the one or more of following information: an identifier to identify Aggregation Communication Link, Tunnel Information (such as IP Address of CP function, TEID of the tunnels from the CP function to the NEF and the TEID of the tunnel from NEF to the CP network function); UE information of UEs in the UE Group; packet delay budget for aggregated PDU, PDU size limit of aggregated PDU. The individual UE information contains UE IDs (e.g. External UE ID, SUPI, IMSI, TMSI), UE Group information of the UE (e.g. Internal Group ID, External Group ID), PDU Session ID, QoS Flow Identifier (QFI).

Communication Link Option 4: If the communication link is to be established between NEF and DN over an tunnel, such as IP tunnel, the SMF may include one or more of following information for the tunnel: an identifier to identify Aggregation Communication Link, the NEF information (e.g. IP address, UDP port number) the Application Server information (for example, IP Address, UDP port number), the Flow Label, the DHCP setting.

Step 2*b*: The NEF sends a Communication Link Establishment response 2503 to the SMF to confirm the establishment of communication link(s) in the NEF.

Step 3*a*: The SMF sends a Communication Link Establishment Request 2504 to the UPF over an interface, such as N4 interface or an SBI interface if the UPF support SBI with SMF. One or more of communication links can be established between the UPF and another network function, such as another UPF (over N9 interface), a (R)AN node (over an N3 interface), an AMF (by using a tunnel, such as GTP-U tunnel), SMF (by using a tunnel, such as GTP-U tunnel), NEF (by using an SBI interface or a tunnel, such as GTP-U tunnel), or DN (by using a tunnel, such as IP tunnel);

If the communication link is to be established between the UPF and a CP function (such as SMF, AMF, NEF) using an SBI interface, the SMF may send to the UPF information described in Communication Link Option 1 in Step 2*a*.

If the communication link is to be established between UPF and a CP function (such as SMF, AMF, NEF) and a UP function (such as (R)AN and UPF) using a tunnel interface, such as GTP-U tunnel protocol, the SMF may send to the UPF information described in Communication Link Option 3 in Step 2*a*.

Additionally, the SMF may perform additional tasks if there are N3 tunnel connection between a (R)AN node and an Intermediate UPF (I-UPF) and an N9 tunnel between I-UPF and the gateway UPF (the UPF that connects to the DN). For the UL, the SMF assigns the same TEID for the N3 UL tunnel and the N9 UL tunnel. For the DL, the (R)AN assigns N3 DL TEID (in step 6*b*), the SMF uses the N3 DL TEID for the N9 DL TEID (in step 8*a*).

If the communication link is to be established between UPF and DN using a tunnel, such as IP tunnel, the SMF may send to the UPF information described in Communication Link Option 4 in Step 2*a*.

Step 3*b*: The UPF sends Communication Link Establishment response 2505 to the SMF over an N4 reference point (or another interface such as SBI) to confirm the establishment of the communication links.

Step 4*a*: The SMF sends a Communication Link Establishment request 2506 to the AMF over N11 reference point. This request can be implemented by an SBI service of the AMF. The request is to use packet aggregation solution over SBI interface. The SMF may include information similar to those described in Communication Link Option 1. For example:

The aggregation communication link is to be established between the SMF and AMF for data delivery on control plane using SBI interface, the SMF may include one or more of the following information: an identifier to identify Aggregation Communication Link, the SMF Address (such as IP Address or FQDN (Fully Qualified Domain Name), or URL) that receives the aggregation PDU; an indication to use packet aggregation over SBI interface such as using HTTP multipart message; packet delay budget for packet aggregation in the AMF; UE information including UE IDs (e.g. External UE ID, SUPI, IMSI, TMSI), UE Group information of UE (e.g. Internal Group ID, External Group ID), PDU Session ID, an indication of QoS Flow (such as QoS Flow Identifier (QFI)) in the PDU Session if the PDU Session has multiple QoS Flows; PDU size limit of aggregated PDU.

The aggregation communication link to be modified is between the (R)AN and AMF for data delivery on control plane using an N2-liked interface, the SMF may include one or more of the following information: an identifier to identify Aggregation Communication Link, the (R)AN Address (such as IP Address or FQDN) that connects with the AMF; an indication to use packet aggregation N2 interface; packet delay budget for packet aggregation in the AMF; UE information including UE IDs (e.g. External UE ID, SUPI, IMSI, TMSI), UE Group information of UE (e.g. Internal Group ID), PDU Session ID, an indication of QoS Flow (such as QoS Flow Identifier (QFI)) in the PDU Session if the PDU Session has multiple QoS Flows; PDU size limit of aggregated PDU.

The aggregation communication link to be modified is between the AMF and the UPF for data delivery between AMF and UPF using an N3-liked interface, the SMF may include one or more of the following information: an identifier to identify Aggregation Communication Link, the UPF Address (such as IP Address or FQDN) that connects with the AMF; an indication to use packet aggregation N2 interface; packet delay budget for packet aggregation in the AMF; UE information including UE IDs (e.g. External UE ID, SUPI, IMSI, TMSI), UE Group information of UE (e.g. Internal Group ID), PDU Session ID, an indication of QoS Flow (such as QoS Flow Identifier (QFI)) in the PDU Session if the PDU Session has multiple QoS Flows; PDU size limit of aggregated PDU.

Step 4*b*: The AMF sends a Communication Link Establishment Response 2507 to the SMF over N11 reference point.

Step 5: The SMF sends an N2 SM Information message to the (R)AN carrying the Communication Link Establishment request. The SMF may use Namf_Communication_N1N2MessageTransfer service 2508 of the AMF to carry the N2 SM Information message to the (R)AN.

If the packet aggregation is performed between the (R)AN and the UPF by using N3 interface, the N2 SM Information message may include one or more of following information: the N2 SM Information may include one or more information: an identifier to identify Aggregation Communication Link, UE Group ID, the UE information of UEs in the UE Group, the UPF Address (e.g. UPF IP address, or AMF FQDN), packet delay budget for aggregated PDU, PDU size limit of aggregated PDU. The individual UE information may contain UE ID, PDU Session ID of UE, an indication of QoS Flow (e.g. QFI) of PDU Session.

Step 6a: The AMF forwards the N2 SM Information 2509 to the (R)AN.

The (R)AN may store the content of N2 SM Information message in the UE Group Context.

The (R)AN may store the information related to packet aggregation as part of PDU Session Context of UE Context. The packet aggregation information may include:

If the packet aggregation is performed between the (R)AN and the UPF by using N3 interface, the (R)AN may store the aggregation tunnel information (UPF Address and UL TEID of N3 aggregation tunnel) to be used for the QoS Flow as part of PDU Session Context of UE Context.

If the packet aggregation is performed between the (R)AN and the AMF, the (R)AN may store the packet aggregation information, including the identifier of QoS Flows (e.g. QFI) of PDU Session as part of PDU Session Context of UE Context.

Step 6b: The (R)AN sends the N2 Message Response 2510, which carries the N2 SM Communication Link Establishment response, to the SMF via the AMF. This message is to confirm that the (R)AN has established communication link with packet aggregation functionality. If the packet aggregation is performed between the (R)AN and the UPF by using N3 interface, the (R)AN may include in the N2 SM Communication Link Establishment response one or more of following information: the DL aggregation tunnel information (including (R)AN Address ((R)AN ID, or (R)AN IP Address or (R)AN FQDN) and DL TEID).

After this step, the (R)AN can send aggregated PDU in the uplink to the UPF or AMF. This step is not shown in FIG. 25.

Step 2511 7: The AMF forwards to the SMF the N2 SM Communication Link Establishment response.

This step can be implemented by using a SBI message, for example Namf_Communication_N1N2MessageTransfer service.

Step 8a: The SMF sends Communication Link Modification Request 2512 to the UPF if the aggregation tunnel is established between the (R)AN and UPF (or I-UPF). The message carries the N3 (R)AN tunnel information received from the (R)AN. The message is sent in an N4 interface, or an SBI interface if the UPF supports SBI messages.

In case an I-UPF is used to connect a (R)AN node and a UPF, the SMF sends Communication Link Modification Request to the UPF. The message carries the N9 I-UPF tunnel information, including I-UPF IP Address, and the DL TEID, where the DL TEID is the same as the DL TEID generated by the (R)AN.

Step 8b: The UPF (or I-UPF) sends Communication Link Modification Response 2513 to the SMF to confirm the modification in the UPF.

Procedure to Modify CP and UP Packet Aggregation

Figure 26:
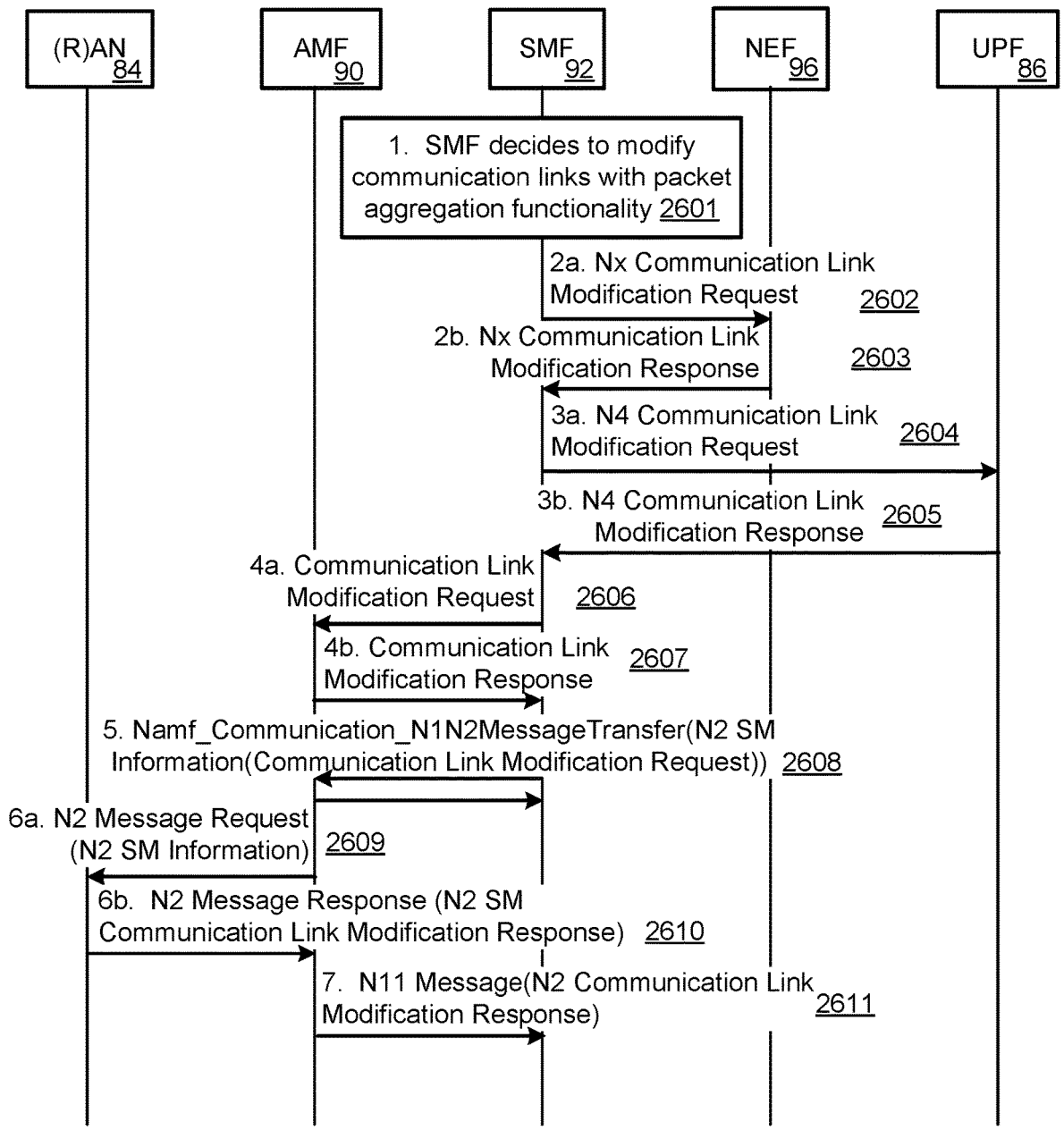
FIG. 26 is a message flow diagram showing an example method to modify a communication link between network functions with packet aggregation functionality.

FIG. 26 is a message flow diagram showing an example method to establish a communication link between network functions with packet aggregation functionality. In the process of FIG. 26, the SMF may request network functions to add or remove one or more QoS Flows of one or more PDU sessions of one or more UEs to the existing communication link with packet aggregation functionality. The SMF can also change the QoS parameters of the communication link such as the packet delay budget, maximum packet size, maximum bit rate. Referring to FIG. 26:

Step 1 illustrated as 26101: The SMF decides to modify communication links with packet aggregation functionality. The trigger may be any one or more of the following:

The SMF receives updates from the UDM, or PCF, or AF about changes in UE Group, such as
  some UEs are added to the UE Group;
  some UEs are no longer in the UE Group;
  UE subscription changes: the bit rate of QoS flow of UE may change (increase or decrease) and this PDUs of QoS Flow are sent in aggregation communication links; the maximum aggregated bit rate of QoS Flows of all UEs in the UE group is changed.

The SMF establishes PDU Session for a UE, and this UE belongs to a UE Group, and one or more QoS flows of PDU Session can be associated with one existing aggregation communication link. The SMF adds QoS Flow(s) of PDU Session to the existing aggregation communication link.

The SMF releases a PDU Session of a UE and this PDU Session has one or more of QoS Flows being associated with an existing aggregation communication link. The SMF removes the association of the QoS Flows with the aggregation communication links.

During the hand-over procedure, the target (R)AN may reject some QoS Flows. The SMF may release the QoS Flow. If this QoS Flow is associated with an existing aggregation communication link, the SMF removes the association of the QoS Flows with the aggregation communication links.

During the hand-over procedure (because of mobility or load balancing), the target (R)AN accepts some QoS Flows. If this QoS Flow is associated with an existing aggregation communication link in the source (R)AN, the SMF modifies the aggregation communication link in the UPF and requests the (R)AN to associate the QoS Flow(s) to one existing aggregation communication link.

If a UE enters CM-IDLE state from CM-CONNECTED state, all the UP connections of PDU Sessions are deactivated as described in clause 4.2.6 of 3GPP TS 23.502. If one or more of QoS Flows of these PDU Sessions are associated with one or more aggregation communication links, the SMF removes the associations of these QoS Flows with the aggregation communication links.

Some events that causes UP connection deactivation described in clause 4.3.7 of 3GPP TS 23.502, such as the UE moves out of local area data network (LADN) service area, the UE moves out of allowed area of a PLMN, the UPF detects that the PDU Session has no data transfer for a specified inactivity period, all the QoS flows of a PDU session is rejected by the target (R)AN during handover procedure.

Step 2a: The SMF sends a Communication Link Modification Request 2602 to the NEF over an Nx interface, in which the Nx could be SBI interface. The SMF sends the one or more of the following information: an identifier to identify aggregation communication link, an indication to add or remove the association of QoS Flows to the aggregation communication link, the UE Group ID, the UE ID(s), PDU Session ID(s) of corresponding UE, and identifier to identify QoS Flow(s) (e.g. QFI) of corresponding PDU Session ID;

the new QoS parameters of aggregation communication link (maximum bit rate, maximum size of aggregated PDU, packet delay budget).

Step 2*b*: The NEF sends a Communication Link Modification response 2603 to the SMF to confirm the modification of communication link(s) in the NEF.

Step 3*a*: The SMF sends a Communication Link Modification Request 2604 to the UPF over an interface, such as N4 interface or an SBI interface if the UPF support SBI with SMF. One or more of aggregation communication links has been established between the UPF and another network function, such as another UPF (over N9 interface), a (R)AN node (over an N3 interface), an AMF (by using a tunnel, such as GTP-U tunnel), SMF (by using a tunnel, such as GTP-U tunnel), NEF (by using an SBI interface or a tunnel, such as GTP-U tunnel), or DN (by using a tunnel, such as IP tunnel);

If the aggregation communication link between the UPF and a CP function (such as SMF, AMF, NEF) using an SBI interface, the SMF may send to the UPF one or more of the following information: an identifier to identify aggregation communication link, an indication to add or remove the association of QoS Flows to the aggregation communication link, the UE Group ID, the UE ID(s), PDU Session ID(s) of corresponding UE, and identifier to identify QoS Flow(s) (e.g. QFI) of corresponding PDU Session ID; the new QoS parameters of aggregation communication link (maximum bit rate, maximum size of aggregated PDU, packet delay budget).

If the communication link is to be established between UPF and a CP function (such as SMF, AMF, NEF) and a UP function (such as (R)AN and UPF) using a tunnel interface, such as GTP-U tunnel protocol, the SMF may send to the UPF one or more of the following information: an identifier to identify aggregation communication link, an indication to add or remove the association of QoS Flows to the aggregation communication link, the UE Group ID, the UE ID(s), PDU Session ID(s) of corresponding UE, and identifier to identify QoS Flow(s) (e.g. QFI) of corresponding PDU Session ID; the new QoS parameters of aggregation communication link (maximum bit rate, maximum size of aggregated PDU, packet delay budget) of UL and DL.

In case the aggregation communication link is N3 tunnel between a UPF and a (R)AN node, the identifier to identify aggregation communication link may be an N4 Session Identifier (ID).

In case the UE is served by a new (R)AN node, the SMF may send the new (R)AN Tunnel Information (new (R)AN node Address, new DL TEID).

If the aggregation communication link is to be modified between UPF and DN using a tunnel, such as IP tunnel, the SMF may send to the UPF one or more of the following information: an identifier to identify aggregation communication link (such as IP address of the UPF, UDP port number, Flow Label, DHCP bit mask), an indication to add or remove the association of QoS Flows to the aggregation communication link, the UE Group ID, the UE ID(s), PDU Session ID(s) of corresponding UE, and identifier to identify QoS Flow(s) (e.g. QFI) of corresponding PDU Session ID; the new QoS parameters of aggregation communication link (maximum bit rate, maximum size of aggregated PDU, packet delay budget) of UL and DL.

Step 3*b*: The UPF sends Communication Link Modification response 2605 to the SMF over an N4 interface (or another interface such as SBI) to confirm the modification of the communication links.

Step 4*a*: The SMF sends a Communication Link Modification request 2606 to the AMF. This request can be implemented by an SBI service of the AMF.

The aggregation communication links to be modified may be one or more of the following links: the link the SMF and AMF for data delivery on control plane using SBI interface, the link between the (R)AN and the AMF, the link between the (R)AN and the UPF. The SMF may include one or more of the following information: an identifier to identify aggregation communication link, an indication to add or remove the association of QoS Flows to the aggregation communication link, the UE Group ID, the UE ID(s), PDU Session ID(s) of corresponding UE, and identifier to identify QoS Flow(s) (e.g. QFI) of corresponding PDU Session ID; the new QoS parameters of aggregation communication link (maximum bit rate, maximum size of aggregated PDU, packet delay budget) of UL and DL.

Step 4*b*: The AMF sends a Communication Link Establishment Response 2607 to the SMF.

Step 5: The SMF sends an N2 SM Information message to the (R)AN carrying the Communication Link Establishment request. The SMF may use Namf_Communication_N1N2MessageTransfer service 2608 of the AMF to carry the N2 SM Information message to the (R)AN.

If the aggregation communication link to be modified between the (R)AN and the UPF by using N3 interface, the N2 SM Information message may include one or more of following information: an identifier to identify aggregation communication link, an indication to add or remove the association of QoS Flows to the aggregation communication link, the UE Group ID, the UE ID(s), PDU Session ID(s) of corresponding UE, and identifier to identify QoS Flow(s) (e.g. QFI) of corresponding PDU Session ID; the new QoS parameters of aggregation communication link (maximum bit rate, maximum size of aggregated PDU, packet delay budget) of UL and DL.

If the UE is to be associated with another UPF, the SMF may include the UPF information (IP Address, UL TEID of aggregation communication link).

If the aggregation communication link to be modified between the (R)AN and the AMF by using an N2-liked interface, the N2 SM Information message may include one or more of following information: an identifier to identify aggregation communication link, an indication to add or remove the association of QoS Flows to the aggregation communication link, the UE Group ID, the UE ID(s), PDU Session ID(s) of corresponding UE, and identifier to identify QoS Flow(s) (e.g. QFI) of corresponding PDU Session ID; the new QoS parameters of aggregation communication link (maximum bit rate, maximum size of aggregated PDU, packet delay budget) of UL and DL.

Step 6*a*: The AMF forwards the N2 SM Information 2609 to the (R)AN.

The (R)AN may store the content of N2 SM Information message in the UE Group Context.

The (R)AN may store the information related to packet aggregation as part of PDU Session Context of UE Context.

Step 6*b*: The (R)AN sends the N2 Message Response 2610, which carries the N2 SM Communication Link Modification response, to the SMF via the AMF. This message is to confirm that the (R)AN has modified the aggregation communication link.

Step 7: The AMF forwards to the SMF the N2 SM Communication Link Modification response 2611.

This step can be implemented by using a SBI message, for example Namf_Communication_N1N2MessageTransfer service.

8. Procedure to Release CP and UP Packet Aggregation

Figure 27:
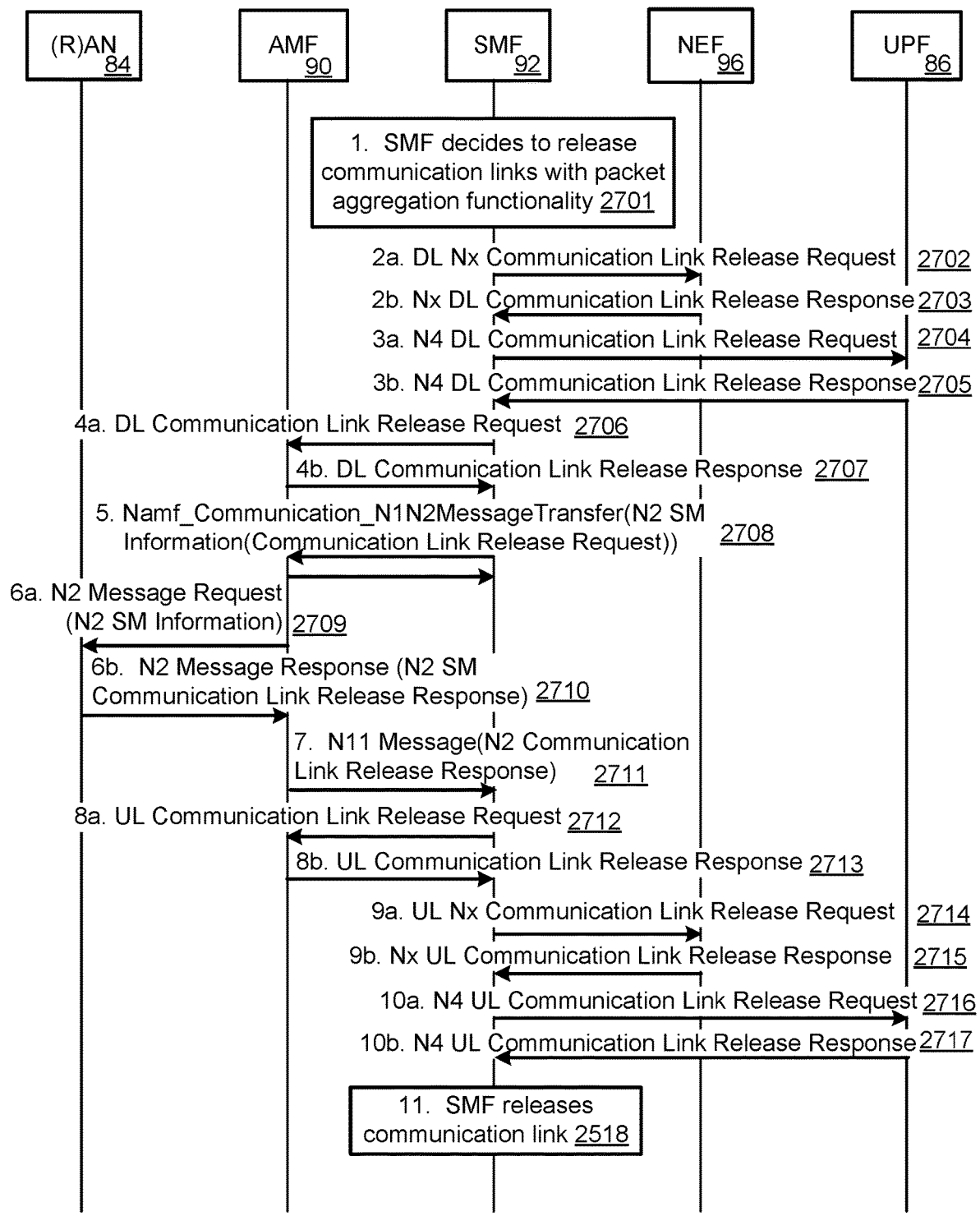
FIG. 27 is a message flow diagram showing an example method to release a communication link between network functions with packet aggregation functionality.

FIG. 27 is a message flow diagram showing an example method to release a communication link between network functions with packet aggregation functionality. In the process of FIG. 27:

Step 1 illustrated at 2701: The SMF decides to release communication links with packet aggregation functionality. The trigger for this decision may be any one or more of the following:

Errors in one or more of network functions (AMF, (R)AN, UPF, SMF, NEF) related to aggregation communication link;

The UE Group is removed: The UDM or AF could inform the SMF that the UE Group is removed.

All the UEs of a UE Group are served by a new (R)AN node or a new CP function (SMF, AMF, NEF) or a new UPF.

The aggregation communication link is no longer needed for a UE Group.

Step 2a: The SMF sends DL Communication Link Release Request 2702 to the NEF. The message may include an Aggregation Communication Link identifier.

The NEF deletes all information related to the Aggregation Communication Link associated with a downlink connection to SMF, or to UPF, or to AMF, or from DN.

Step 2b: The NEF sends DL Communication Link Release Response 2703 to the SMF to confirm the release of aggregation communication link.

Step 3a: The SMF sends DL Communication Link Release Request 2704 to the UPF. The message may include an Aggregation Communication Link identifier.

The UPF deletes all information related to the Aggregation Communication Link associated with a downlink connection to SMF, or to (R)AN, or to I-UPF. The UPF also deletes the Aggregation Communication Link information associated with QoS Flow(s) in the PDU Session Context of UE Context.

Step 3b: The UPF sends DL Communication Link Release Response 2705 to the SMF to confirm the release of aggregation communication link.

Step 4a: The SMF sends DL Communication Link Release Request 2706 to the AMF. The message may include an Aggregation Communication Link identifier.

The AMF deletes all information related to the Aggregation Communication Link associated with a downlink connection to (R)AN. The AMF also deletes the Aggregation Communication Link information associated with DL QoS Flow(s) in the PDU Session Context of UE Context.

Step 4b: The AMF sends DL Communication Link Release Response 2707 to the SMF to confirm the release of aggregation communication link.

Step 5: The SMF sends N2 SM Information containing Communication Link Release Request to the (R)AN via the AMF. The message may include an Aggregation Communication Link identifier. The SMF may use Namf_Communication_N1N2MessageTransfer service 2708 of the AMF to carry the N2 SM Information.

Step 6a: The AMF forwards the N2 SM Information 2709 to the (R)AN.

The (R)AN deletes all information related to the Aggregation Communication Link associated with the uplink and downlink aggregation communication links with (R)AN. The AMF also deletes the Aggregation Communication Link information associated with QoS Flow(s) in the PDU Session Context of UE Context.

Step 6b: The (R)AN sends and N2 Message Response 2710 carrying N2 Communication Link Release Response to the SMF to confirm the release of aggregation communication link via AMF.

Step 7: The AMF forwards the N2 Communication Link Release Response 2711 to the SMF.

Step 8a: The SMF sends UL Communication Link Release Request 2712 to the AMF. The message may include an Aggregation Communication Link identifier.

The AMF deletes all information related to the Aggregation Communication Link associated with the UL connection to (R)AN. The AMF also deletes the Aggregation Communication Link information associated with UL QoS Flow(s) in the PDU Session Context of UE Context.

Step 8b: The AMF sends DL Communication Link Release Response 2713 to the SMF to confirm the release of aggregation communication link.

Step 9a: The SMF sends UL Communication Link Release Request 2714 to the NEF. The message may include an Aggregation Communication Link identifier.

The NEF deletes all information related to the Aggregation Communication Link associated with a UL connection to SMF, or to UPF, or to AMF, or to DN.

Step 9b: The NEF sends UL Communication Link Release Response 2715 to the SMF to confirm the release of UL aggregation communication link.

Step 10a: The SMF sends UL Communication Link Release Request 2716 to the UPF. The message may include an Aggregation Communication Link identifier.

The UPF deletes all information related to the Aggregation Communication Link associated with a downlink connection to SMF, or to (R)AN, or to I-UPF. The UPF also deletes the Aggregation Communication Link information associated with UL QoS Flow(s) in the PDU Session Context of UE Context.

Step 10b: The UPF sends UL Communication Link Release Response 2717 to the SMF to confirm the release of aggregation communication link.

Step 11 illustrated at 2718: The SM deletes all information related to the aggregation communication links for UL and DL.

In some scenarios, such as the network function failure, some steps can be combined, for example: steps 2 and 9 can be combined; steps 3 and 10 can be combined; steps 4 and 8 can be combined.

The UP connection of a PDU Session of UE may be deactivated, for example due to AN Release procedure in clause 4.2.6, or clause 4.3.7 of 3GPP TS 23.502 version 15.1.0. In these scenarios, the (R)AN removes the per-PDU session N3 tunnel information, the UPF may removes per-PDU session tunnel information for N3 and optionally N9 interfaces. If one or more of QoS Flows of these PDU Sessions are associated with one or more aggregation communication links, the (R)AN may remove the associations of these QoS Flows with the aggregation communication links at the same time the (R)AN releases (or delete) the per-PDU session tunnel information of N3 interfaces; the UPF may remove the associations of these QoS Flows with the aggregation communication links at the same time the UPF releases (or delete) the per-PDU session tunnel information of N3 and optionally N9 interfaces.

The UP connection of a PDU Session of UE may be switched from one Source (R)AN node to another Target (R)AN node during handover procedure, for example as specified in clause 4.9 of 3GPP TS 23.502 version 15.1.0. During the handover procedure, the Source (R)AN node may include the aggregation tunnel information of QoS flows to the Target (R)AN node. The Target (R)AN node may associate these QoS flows with existing aggregated tunnels or aggregated communication links available in the Target (R)AN node, over the N3 or N2 reference points for both UL and DL. Alternatively, the SMF may send a message, for example N2 Aggregated Tunnel Modification Request or N2 SM PDU Session Modification Command, to the (R)AN that indicates the association of the QoS flows with existing aggregated tunnels on N3 or N2 reference points for both UL and DL. During the handover procedure, the SMF sends N4 Session Modification Request to the UPF. The message contains the per-PDU session tunnel information and aggregation tunnels information for both UL and DL on the N3 and N9 reference points.

Based on the foregoing, it may be appreciated that embodiments of the present invention may comprise at least some of the following features:

A method executed by a session management function comprising:
  receiving trigger information from a network function relating to the status of an interface capable of using an aggregated tunnel between first and second user plane functions; and
  subsequent to the occurrence of receiving trigger information, sending messages to cause the change to the status of the interface with respect to the aggregated tunnel.
In some embodiments the change of the status of the interface with respect to the aggregated tunnel is selected from at least one of:
  establishing the aggregated tunnel;
  modifying the aggregated tunnel; and
  releasing the aggregated tunnel.
In some embodiments sending messages comprises sending the messages to the user plane functions which use the interface.
In some embodiments sending messages comprises sending the format of the aggregated tunnel to the user plane functions.
In some embodiments sending messages comprises sending criteria to select PDU packets of a PDU session over the aggregated tunnel.
In some embodiments the method further comprises determining whether a change to the status of an aggregated tunnel should be made.
A method executed by a packet aggregation function of a user plane function comprising:
  receiving a packet;
  evaluation selection criteria in relation to the packet; and
  selecting a type of tunnel to transport the packet.
In some embodiments selecting a type of tunnel to transport the packet comprises selecting one of:
  a per PDU session tunnel; and
  an aggregated tunnel.
In some embodiments the selection criteria includes at least one of:
  size of the packet;
  Quality of Service requirement for the packet; and
  destination of the packet.
A network function comprising:
  a network interface for receiving data from and transmitting data to network functions connected to a network;
  a processor; and
  a non-transient memory for storing instructions that when executed by the processor cause the network function to be configured to perform the methods as described herein.

It is noted that in some embodiments, if a PDU from a QoS flow is to be aggregated, it will be sent to PAF buffer of the Packet Aggregation Function. The aggregated PDUs have packet delay budget according to the aggregation criteria. If the packet delay reaches the packet delay budget and no other packets arrive, this single PDU will be sent on the aggregated tunnel. Accordingly, one or more UL PDUs can be sent on the aggregated tunnel. Accordingly, in some embodiments the aggregation criteria includes a packet delay budget, and the UL PDUs in the aggregated PDU are received within the packet delay budget.

It is noted that the RAN node creates a UE Context, which includes one or more PDU Session Contexts. The PDU Session Context includes QoS Flow information, such as QoS Rules. In some embodiments, based on the packet aggregation criteria received from the SMF, the (R)AN node may include in the QoS Flow information an indication indicating whether the PDUs of the QoS flow will be sent on a per-PDU tunnel or in an aggregated tunnel.

An aspect of the disclosure provides a method executed by a network function of wireless network. The method includes obtaining, by the network function, aggregation criteria from a session management function (SMF). The method further includes receiving, by the network function, one or more uplink (UL) protocol data units (PDUs). The method further includes forwarding, by the network function, an aggregated PDU to a core network function in accordance with the aggregation criteria, the aggregated PDU including the received one or more UL PDUs. In some embodiments, the network function includes an aggregation function associated. In some embodiments, receiving one or more UL PDUs includes at least one of: receiving UL PDUs from one or more user equipment (UE)s within a predetermined UE group; receiving UL PDUs associated with a predetermined PDU session from one or more UEs; and receiving UL PDUs associated with a predetermined QoS flow from one or more UEs. In some embodiments, the aggregation criteria includes a predetermined maximum size, and a size of the aggregated PDU is smaller than or equal to the predetermined maximum size. In some embodiments, the core network function includes either one of a user plane function (UPF) of the core network and a control plane (CP) function of the core network. In some embodiments, the UL PDUs include Non-Access Stratum (NAS) PDUs; and the core network function one of an access and mobility management function (AMF) of the core network and a session management function (SMF). In some embodiments, the received one or more UL PDUs include at least one of N2 Non-Access Stratum (NAS) messages and Non-Access Stratum (NAS) PDUs. In some embodiments, the aggregation criteria is associated with a destination address of the PDUs, and the PDUs to be aggregated in the aggregated PDU have a common destination address. In some embodiments, the method further includes receiving an aggregated PDU from a core network function; de-aggregating the received aggregated PDU to recover one or more downlink (DL) PDUs; and forwarding the de-aggregated DL PDU to one or more UEs in accordance with a respective header of each recovered DL PDU. In some embodiments, the network function includes a de-aggregation function. In some embodiments, the criteria includes a packet delay budget, and the UL PDUs in the aggregated PDU are received within the packet delay budget. In some embodiments, the aggregated PDU includes an aggregated encapsulation header including a PDU type field. In some embodiments, the aggregated PDU further includes a PDU encapsulation header for each UL PDU, with each PDU encapsulation header including a PDU type field. In some embodiments, each UL PDU has a common destination; the aggregated PDU includes an aggregated encapsulation header including a number of PDUs field; and at least one field indicating the length of each UL PDU in the aggregated PDU. In some embodiments, a PDU type is in a UE context, the PDU type indicating whether a PDU is a single PDU or an aggregated PDU. In some embodiments, the network function is one of: a user plane function; an access node; and a control plane function. In some embodiments, the method further includes buffering the received UL PDUs prior to adding the received UL PDUs to the aggregated PDU.

An aspect of the disclosure provides a network node. The network node includes at least one radio interface for communicating with user equipment (UE); a packet aggregation function (PAF); a processor; and non-transitory machine readable memory. The non-transitory machine readable memory stores machine readable instructions for configuring the network node to execute the steps described herein. For example, the steps include obtaining, by the network function, aggregation criteria from a session management function (SMF); receiving, by the network function, one or more uplink (UL) protocol data units (PDUs); and forwarding, by the network function, an aggregated PDU to a core network function in accordance with the aggregation criteria, the aggregated PDU comprising the received one or more UL PDUs. In some embodiments. In some embodiments, receiving one or more UL PDUs comprises at least one of: receiving UL PDUs from one or more user equipment (UE)s within a predetermined UE group; receiving UL PDUs associated with a predetermined PDU session from one or more UEs; and receiving UL PDUs associated with a predetermined QoS flow from one or more UEs. In some embodiments, the aggregation criteria is associated with a destination address of the PDUs, and the PDUs to be aggregated in the aggregated PDU have a common destination address. In some embodiments, the UL PDUs include Non Access Stratum (NAS) PDUs; and the core network function includes one of an access and mobility management function (AMF) of the core network and a session management function (SMF). In some embodiments, the network node is one of: a user plane function; an access node; and a control plane function. In some embodiments, the core network function includes either one of a user plane function (UPF) of the core network and a control plane (CP) function of the core network. In some embodiments, the network node further comprises a de-aggregation function.

An aspect of the disclosure provides a method executed by a session management function (SMF). The method includes obtaining a trigger from a first network function. The method further includes according to the trigger, determining to establish or update or release an aggregation tunnel. The method further includes sending a message indicating the determination. In some embodiments, sending a message comprises sending messages to at least one of an access node and a UPF. In some embodiments, the access node comprising one or both of an aggregation function and a de-aggregation function configured to receive the message, or the UPF comprising one or both of an aggregation function and a de-aggregation function to receive the message. In some embodiments, the message comprises identifying the aggregated tunnel. In some embodiments, the message comprises criteria for establishing or updating the aggregated tunnel. In some embodiments, the criteria is associated with PDUs to be aggregated in the aggregated tunnel, the PDUs having a common destination address. In some embodiments, the message comprises an aggregated tunnel establishment request. In some embodiments, the first network function is one of an application function, an NEF, a UDM, the SMF, an NMF and aPCF. In some embodiments, the trigger is receiving from an application function.

An aspect of the disclosure provides a method executed by a session management function (SMF). The method includes obtaining a trigger from a first network function. The method further includes according to the trigger, determining to establish or update or release an interface in a control plane associated with UEs whose PDUs are to be aggregated or de-aggregated. The method further includes sending a message indicating the determination. In some embodiments, the method further includes determining criteria associated with an aggregated PDU, the interface being associated with the criteria. In some embodiments, the criteria is indicated in the message. In some embodiments, the interface is between the SMF and an AMF, and the criteria is associated with an establishment or an update of an interface between the AMF and an access node. In some embodiments, the interface is between the SMF and an NEF, and the criteria is associated with an establishment or an update of an interface between the SMF and the NEF. In some embodiments, the interface is between the SMF and an UPF, and the criteria is associated with an establishment or an update of an interface between the SMF and the UPF. In some embodiments, the first network function is one of an application function, an UDM, a PCF, a NMF and the SMF.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method executed by a network function of wireless network, the method comprising: obtaining, by the network function, aggregation criteria from a session management function (SM F); receiving, by the network function, one or more uplink (UL) protocol data units (PDUs); and forwarding, by the network function, an aggregated PDU to a core network function in accordance with the aggregation criteria, the aggregated PDU comprising the received one or more UL PDUs; wherein a packet header of the aggregated PDU type contains a PDU type indicator indicating the associated PDU is the aggregated PDU and a tunnel endpoint identifier of the aggregated PDU; wherein each PDU header of each packet in the aggregated PDU contains a PDU type indicator indicating the PDU type is a single PDU and a tunnel endpoint identifier of the single PDU;

wherein the aggregation criteria includes a predetermined maximum size, and a size of the aggregated PDU is smaller than or equal to the predetermined maximum size; or wherein the aggregation criteria is associated with a destination address of the PDUs, and the PDUs to be aggregated in the aggregated PDU have a common destination address; or wherein the aggregation criteria includes a packet delay budget, and the UL PDUs in the aggregated PDU are received within the packet delay budget.

2. The method of claim 1 wherein the network function comprises an aggregation function of a user plane function.

3. The method of claim 1 wherein receiving one or more UL PDUs comprises at least one of: receiving UL PDUs from one or more user equipments (UEs) within a predetermined UE group; receiving UL PDUs associated with a predetermined PDU session from one or more UEs; and receiving UL PDUs associated with a predetermined QoS flow from one or more UEs.

4. The method of claim 1 wherein the core network function comprises either one of a user plane function (UPF) of the core network and a control plane (CP) function of the core network.

5. The method of claim 1 wherein: the UL PDUs include Non Access Stratum (NAS) PDUs; and the core network function comprises one of an access and mobility management function (AMF) of the core network and a session management function (SMF).

6. The method of claim 1 further comprising: receiving an aggregated PDU from a core network function; de-aggregating the received aggregated PDU to recover one or more downlink (DL) PDUs; and forwarding the de-aggregated DL PDU to one or more UEs in accordance with a respective header of each recovered DL PDU.

7. The method of claim 1 wherein the aggregated PDU includes an aggregated encapsulation header including a PDU type field.

8. The method of claim 7 the aggregated PDU further includes a PDU encapsulation header for each UL PDU, with each PDU encapsulation header including the PDU type field.

9. The method of claim 1 wherein a PDU type is in a UE context, the PDU type indicating whether a PDU is a single PDU or an aggregated PDU.

10. A network node comprising: at least one radio interface for communicating with user equipment (UE); a packet aggregation function (PAF) of a user plane function; a processor; and non-transitory machine readable memory storing machine readable instructions for configuring the network node to execute the steps of: obtaining, by the network function, aggregation criteria from a session management function (SMF); receiving, by the network function, one or more uplink (UL) protocol data units (PDUs); and forwarding, by the network function, an aggregated PDU to a core network function in accordance with the aggregation criteria, the aggregated PDU comprising the received one or more UL PDUs; wherein a packet header of the aggregated PDU type contains a PDU type indicator indicating the associated PDU is the aggregated PDU and a tunnel endpoint identifier of the aggregated PDU; wherein each PDU header of each packet in the aggregated PDU contains a PDU type indicator indicating the PDU type is a single PDU and a tunnel endpoint identifier of the single PDU;
wherein the aggregation criteria includes a predetermined maximum size, and a size of the aggregated PDU is smaller than or equal to the predetermined maximum size; or wherein the aggregation criteria is associated with a destination address of the PDUs, and the PDUs to be aggregated in the aggregated PDU have a common destination address; or wherein the aggregation criteria includes a packet delay budget, and the UL PDUs in the aggregated PDU are received within the packet delay budget.

11. The network node of claim 10 wherein receiving one or more UL PDUs comprises at least one of: receiving UL PDUs from one or more user equipments (UEs) within a predetermined UE group; receiving UL PDUs associated with a predetermined PDU session from one or more UEs; and receiving UL PDUs associated with a predetermined QoS flow from one or more UEs.

12. The network node of claim 10 wherein the UL PDUs include Non Access Stratum (NAS) PDUs; and the core network function comprises one of an access and mobility management function (AM F) of the core network and a session management function (SMF).

13. The network node of claim 10 wherein the network node is one of: a user plane function; an access node; and a control plane function.

14. The network node of claim 10 wherein the core network function comprises either one of a user plane function (UPF) of the core network and a control plane (CP) function of the core network.

15. The network node of claim 10 wherein the network node further comprises a de-aggregation function to de-aggregate a received aggregated PDU to recover one or more downlink (DL) PDUs.

16. A communication system comprising at least one processor and a memory storing instruction for execution by the at least one processor to implement a network function, a session management function (SMF) and a core network function, the network function, SMF and core network function being communicatively coupled through an interface wherein: the network function is configured to: obtain aggregation criteria from the SMF; receive one or more uplink (UL) protocol data units (PDUs); forward an aggregated PDU to the core network function in accordance with the aggregation criteria, the aggregated PDU comprising the received one or more UL PDUs; wherein a packet header of the aggregated PDU type contains a PDU type indicator indicating the associated PDU is the aggregated PDU and a tunnel endpoint identifier of the aggregated PDU; wherein each PDU header of each packet in the aggregated PDU contains a PDU type indicator indicating the PDU type is a single PDU and a tunnel endpoint identifier of the single PDU; the SMF is configured to provide aggregation criteria to the network function; and the core network function is configured to receive the aggregated PDU from the network function;
wherein the aggregation criteria includes a predetermined maximum size, and a size of the aggregated PDU is smaller than or equal to the predetermined maximum size; or wherein the aggregation criteria is associated with a destination address of the PDUs, and the PDUs to be aggregated in the aggregated PDU have a common destination address; or wherein the aggregation criteria includes a packet delay budget, and the UL PDUs in the aggregated PDU are received within the packet delay budget.

* * * * *